(12) United States Patent
Nagatani et al.

(10) Patent No.: US 9,694,782 B2
(45) Date of Patent: Jul. 4, 2017

(54) AIRBAG APPARATUS

(71) Applicant: MAZDA MOTOR CORPORATION, Hiroshima (JP)

(72) Inventors: Takashi Nagatani, Hiroshima (JP); Ryusuke Asahi, Hiroshima (JP); Hiroaki Takeshita, Aki-gun (JP); Yoichi Miyajima, Aki-gun (JP); Ichirou Kamimoto, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 15/022,527

(22) PCT Filed: May 15, 2015

(86) PCT No.: PCT/JP2015/064104
§ 371 (c)(1),
(2) Date: Mar. 16, 2016

(87) PCT Pub. No.: WO2016/006319
PCT Pub. Date: Jan. 14, 2016

(65) Prior Publication Data
US 2016/0250993 A1    Sep. 1, 2016

(30) Foreign Application Priority Data
Jul. 8, 2014  (JP) .................................. 2014-140323

(51) Int. Cl.
*B60R 21/2338* (2011.01)
*B60R 21/203* (2006.01)
(Continued)

(52) U.S. Cl.
CPC ........ *B60R 21/2338* (2013.01); *B60R 21/203* (2013.01); *B60R 21/231* (2013.01);
(Continued)

(58) Field of Classification Search
CPC . B60R 21/2338; B60R 21/231; B60R 21/203; B60R 2021/0009; B60R 2021/0048
See application file for complete search history.

(56) References Cited

U.S. PATENT DOCUMENTS

| 3,752,501 A | 8/1973 | Daniel et al. |
| 6,042,147 A | 3/2000 | Nishijima et al. |
| (Continued) | | |

FOREIGN PATENT DOCUMENTS

| JP | S48-050437 A | 7/1973 |
| JP | 3024234 U | 5/1996 |
| (Continued) | | |

OTHER PUBLICATIONS

International Search Report—PCT/JP2015/064104 mailed Aug. 4, 2015.

*Primary Examiner* — Darlene P Condra
(74) *Attorney, Agent, or Firm* — Studebaker & Brackett PC

(57) ABSTRACT

The present application discloses a control device for an automatic transmission mounted in a vehicle including idling stop means for automatically stopping an engine when a predetermined stop condition is satisfied, and restarting the engine when a predetermined restart condition is satisfied in an engine automatically stopped state. The control device for the automatic transmission includes a first friction element and a second friction element fastened in a starting stage of the automatic transmission; and hydraulic-pressure controlling means for controlling hydraulic pressure for fastening the first and second friction elements. The first friction element includes a return spring that urges a piston of the first friction element to a release side. The second friction element includes a friction plate, a pressing piston that presses the friction plate, and a clearance adjustment piston (Continued)

that supports the pressing piston so as to allow relative movement of the pressing piston.

15 Claims, 21 Drawing Sheets

(51) Int. Cl.
 *B60R 21/231* (2011.01)
 *B60R 21/00* (2006.01)
(52) U.S. Cl.
 CPC ............. *B60R 2021/0009* (2013.01); *B60R 2021/0048* (2013.01)

(56) References Cited

U.S. PATENT DOCUMENTS

| | | | | |
|---|---|---|---|---|
| 6,536,801 B2* | 3/2003 | Frisch | ............... | B60R 21/2165 280/728.2 |
| 7,946,619 B2* | 5/2011 | Mendez | ............... | B60R 21/231 280/743.1 |
| 8,579,321 B2* | 11/2013 | Lee | ............... | B60R 21/214 280/729 |
| 2002/0008374 A1* | 1/2002 | Keshavaraj | ............ | B60R 21/231 280/743.1 |
| 2004/0160039 A1* | 8/2004 | Heist | ............... | B60R 21/203 280/728.2 |
| 2004/0183288 A1* | 9/2004 | Aygun | ............... | B60R 21/231 280/731 |
| 2006/0082114 A1* | 4/2006 | Heym | ............... | B60R 21/233 280/743.1 |
| 2006/0186656 A1* | 8/2006 | Kumagai | ............... | B60R 21/231 280/743.2 |
| 2007/0108753 A1* | 5/2007 | Pang | ............... | B60R 21/231 280/743.2 |
| 2007/0152435 A1* | 7/2007 | Jamison | ............... | B60R 21/233 280/743.2 |
| 2009/0224522 A1* | 9/2009 | Fischer | ............... | B60R 21/231 280/743.1 |
| 2010/0007124 A1* | 1/2010 | Fischer | ............... | B60R 21/233 280/743.1 |
| 2010/0102542 A1* | 4/2010 | Nakajima | ............... | B60R 21/233 280/743.2 |
| 2012/0205900 A1* | 8/2012 | Mallinger | ............... | B60R 21/231 280/743.2 |
| 2012/0261910 A1* | 10/2012 | Fischer | ............... | B60R 21/205 280/732 |
| 2013/0087995 A1 | 4/2013 | Lee et al. | | |
| 2013/0181429 A1* | 7/2013 | Weng | ............... | B60R 21/2338 280/731 |
| 2013/0292927 A1 | 11/2013 | Lee et al. | | |

FOREIGN PATENT DOCUMENTS

| | | |
|---|---|---|
| JP | H10-264761 A | 10/1998 |
| JP | 2005-206067 A | 8/2005 |
| JP | 2005-212566 A | 8/2005 |
| JP | 2007-055501 A | 3/2007 |
| JP | 2012-061882 A | 3/2012 |
| JP | 2013-082418 A | 5/2013 |
| JP | 2013-082454 A | 5/2013 |
| WO | 98/14353 A1 | 4/1998 |

* cited by examiner

DIRECTION OF DISPLACEMENT

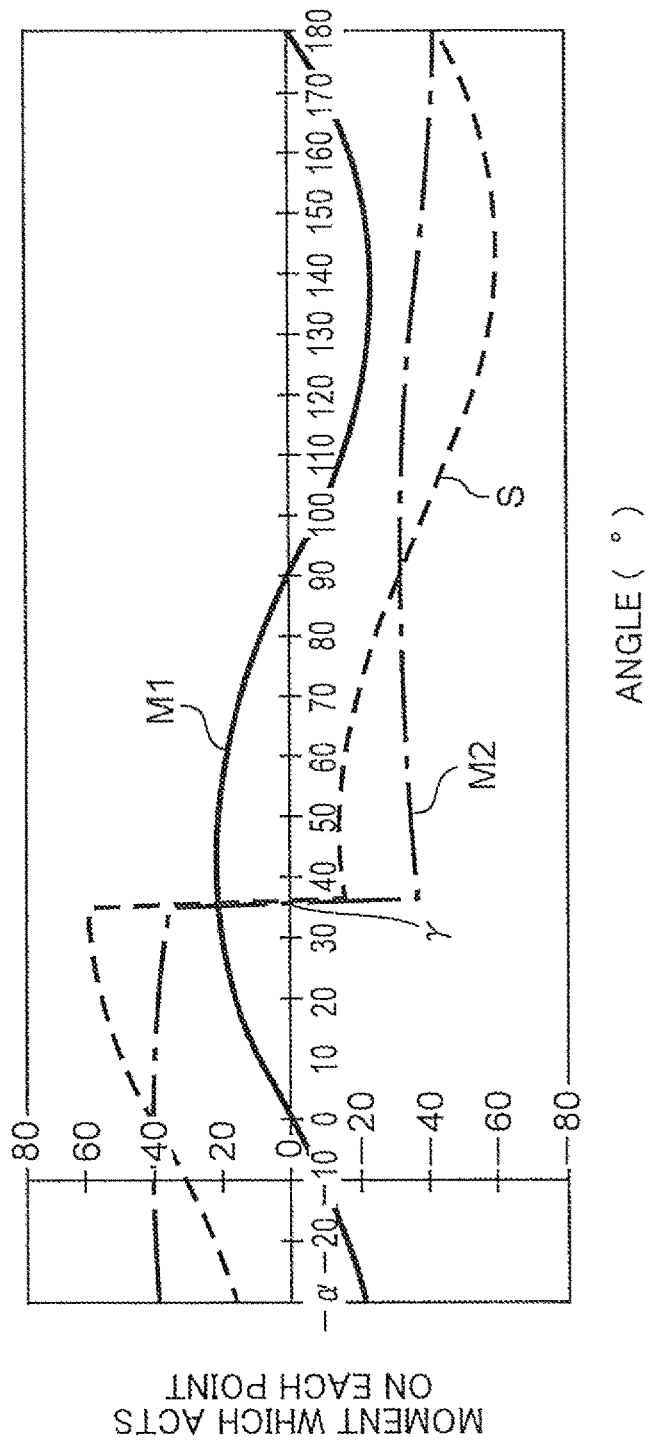

AIRBAG APPARATUS

TECHNICAL FIELD

The present invention relates to an airbag apparatus.

BACKGROUND ART

Conventionally, an airbag apparatus is provided in front of a driver's seat and a passenger seat of a vehicle to protect an occupant from a collision impact. Patent Document 1 discloses an example of an airbag apparatus.

The airbag apparatus described in Patent Document 1 is provided with a recessed portion, which extends in a vertical direction near a center of a passenger's side during expansion and deployment, and protruded portions situated on both left and right sides of the recessed portion. During the expansion and deployment of the airbag, a front side of an occupant's head enters the recessed portion and is protected from a collision impact.

With regard to the airbag apparatus described in Patent Document 1, the head, however, may roll on a surface of the airbag when another vehicle diagonally collides with the vehicle from front. Adjustment to a shape, deployment pressure or alike of the airbag may contribute to overcoming the aforementioned problem. It has been repeated to make prototypes and conduct experiments for identifying optimum conditions about the shape, deployment pressure or alike. However, these conventional approaches take a long development time.

Patent Document

Patent Document 1: JP 2013-82454 A

SUMMARY OF INVENTION

The present invention has been developed in consideration of the aforementioned circumstances. An object is to provide an airbag apparatus configured to prevent an occupant's head from rolling on a surface of an airbag when an obstacle diagonally collides with a vehicle from front.

As a result of intensive research conducted in order to solve the aforementioned problem, the present inventors have figured out that an occupant's head receives a dynamic friction force and a normal force from a surface of an expanded and deployed airbag when a vehicle is diagonally impacted from front. The dynamic friction force and the normal force cause a moment to turn the occupant's head. The present invention has been developed on the basis of the aforementioned learnings.

The present invention provides an airbag apparatus for a vehicle. The airbag apparatus includes a bag body which is expanded and deployed by expansion gas supplied when the vehicle receives an external impact. The bag body includes a front section which is expanded and deployed rearward in a range from diagonally forward left to diagonally forward right of an occupant's head; a left section which is expanded and deployed so as to project rearward from a left edge of the front section; and a right section which is expanded and deployed so as to project rearward from a right edge of the front section. The bag body is expanded and deployed to make the occupant's head in a pushing state when the vehicle diagonally receives an impact from front so that the occupant's head is displaced diagonally forward. Meanwhile, a front surface of the occupant's head pushes a surface of the front section whereas a side surface of the occupant's head pushes a surface of the left or right section. A normal force and a dynamic friction force cause a first directional moment to turn the occupant's head in a first direction when the front surface of the occupant's head receives the normal force and the dynamic friction force from the surface of the front section under the pushing state. A second directional moment acts to turn the occupant's head in a second direction opposite to the first direction, the second directional moment being caused by a normal force and a dynamic friction force which the side surface of the occupant's head receives from the surface of the left or right section.

BRIEF DESCRIPTION OF DRAWINGS

FIG. 1A is a front view in an expanded and deployed state. FIG. 1B is a sectional view taken along line A-A depicted in FIG. 1A.

FIG. 2A is a side view of a bag body before expansion and deployment. FIG. 2B is a side view of the bag body after expansion and deployment.

FIG. 7 shows an exemplificative range of contact between the bag body and the head.

FIG. 11 is a graph showing a moment resultant from a normal force which acts on an occupant's head, a moment resultant from a dynamic friction force which acts on the occupant's head, and a sum of the moments.

FIG. 14A is a front view in an expanded and deployed state. FIG. 14B is a sectional view taken along line A-A in FIG. 14A.

FIG. 15A is a front view in an expanded and deployed state. FIG. 15B is a sectional view taken along line A-A depicted in FIG. 15A.

FIG. 18A is a front view in an expanded and deployed state. FIG. 18B is a sectional view taken along line A-A depicted in FIG. 18A.

FIG. 19A is a front view in an expanded and deployed state. FIG. 19B is a sectional view taken along line A-A depicted in FIG. 19A. FIG. 19C is a sectional view taken along line B-B depicted in FIG. 19B.

FIG. 21 shows an exemplificative range of contact between the bag body and the occupant's head.

FIG. 24A is a front view in an expanded and deployed state. FIG. 24B is a sectional view taken along line A-A depicted in FIG. 24A.

FIG. 25A is a front view in an expanded and deployed state. FIG. 25B is a sectional view taken along line A-A depicted in FIG. 25A.

DESCRIPTION OF EMBODIMENTS

Hereinafter, preferred embodiments of the present invention are described with reference to the accompanying drawings.

First Embodiment

An airbag apparatus 1 according to the first embodiment is described with reference to FIGS. 1 to 13.

In the following description, "front", "rear", "left" and "right" refer to forward, rearward, leftward, and rightward of a vehicle to which the airbag apparatus 1 is mounted, respectively. "Vertical" does not mean only a vertical direction but also directions which are inclined by a certain degree from the vertical direction.

Figure 1A:
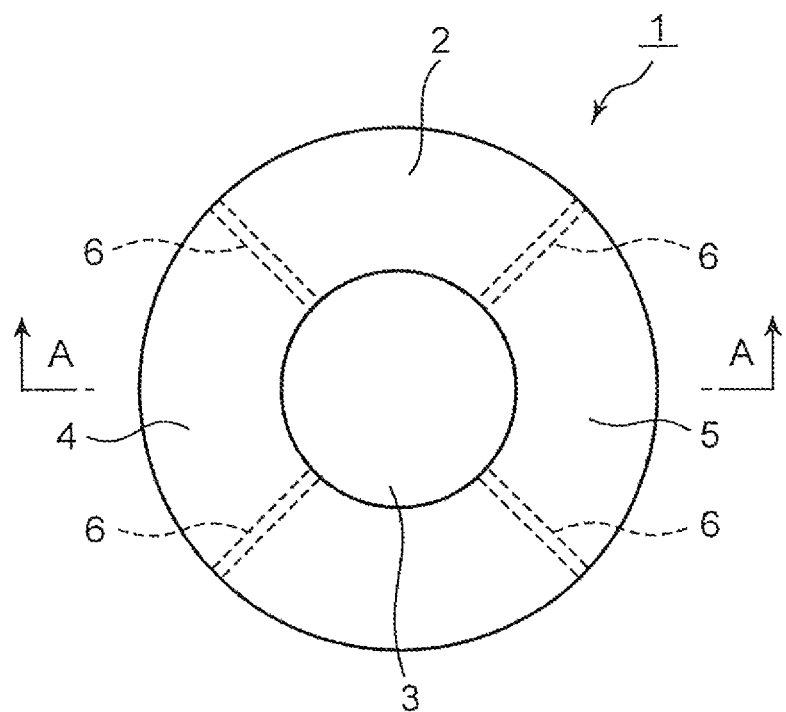
FIGS. 1A and 1B are diagrams showing a configuration of a bag body according to the first embodiment of the present invention.
Figure 1B:
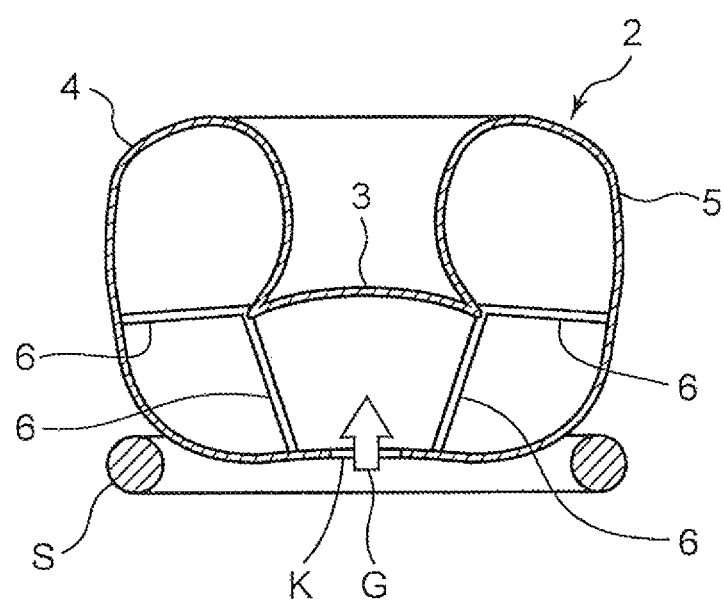

As shown in FIG. 1, the airbag apparatus 1 includes a bag body 2 which is expanded and deployed by expansion gas G supplied when the vehicle receives an external impact.

Figure 2A:
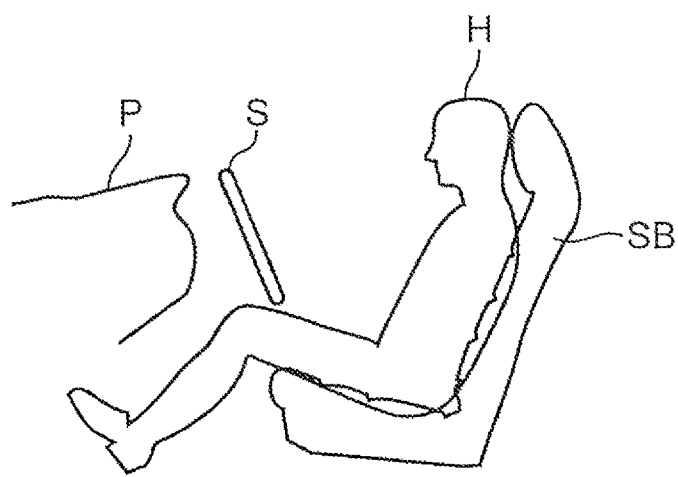
FIGS. 2A and 2B are diagrams showing an example to provide the airbag apparatus according to the first embodiment of the present invention on a steering wheel.
Figure 2B:
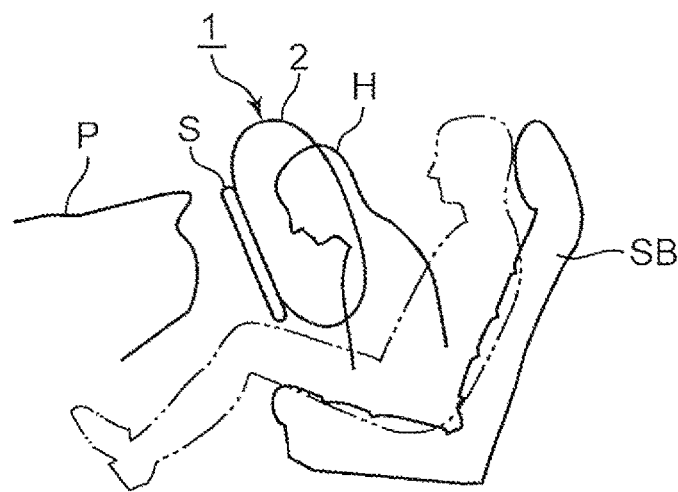

For example, the airbag apparatus 1 is provided in a central portion of a steering wheel S as shown in FIG. 2.

As shown in FIG. 1, the bag body 2 includes a front section 3, a left section 4 and a right section 5. Pieces of sheets are sewn to form the bag body 2. Although a material of the sheets is not particularly limited, for example, the sheets are formed by flexible woven fabric made up of polyester-based or polyamide-based yarns. The bag body 2 is folded and stored in a storage chamber (not shown) provided in the central portion of the steering wheel S unless the bag body 2 is used.

As shown in FIG. 1, shape retaining tethers 6 configured to restrict expansion and deployment of the bag body 2 are provided inside the bag body 2. The shape retaining tethers 6 are formed by, for example, the same material as the bag body 2. The shape retaining tethers 6 are provided inside the front, left and right sections 3, 4, 5, respectively. The shape retaining tethers 6 allow the bag body 2 to be expanded and deployed when the expansion gas G is supplied, so that the bag body 2 has a shape with the front, left and right sections 3, 4, 5. Without the shape retaining tethers 6, the bag body 2 is expanded in a ball-like shape which does not have any depressions and protrusions.

Figure 3:
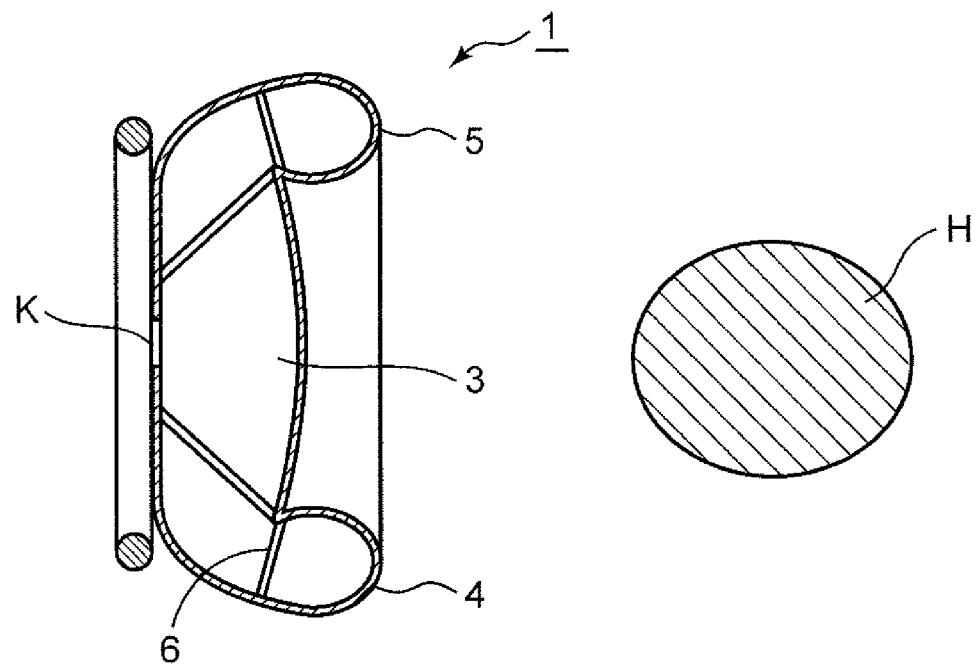
FIG. 3 is a sectional view of the bag body according to the first embodiment of the present invention before an occupant's head collides with the expanded and deployed bag body.
Figure 4:
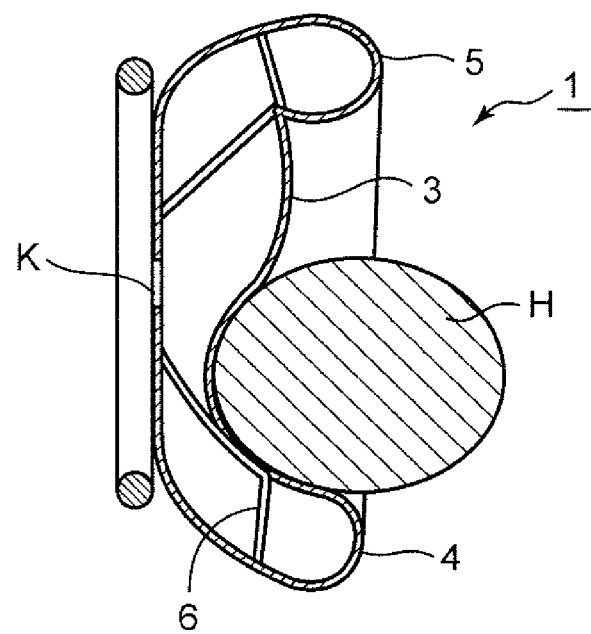
FIG. 4 is a sectional view of the bag body according to the first embodiment of the present invention after an occupant's head collides with the expanded and deployed bag body.

A gas supply port K is formed on a front surface of the front section 3. The gas supply port K is connected to a gas generator (not shown). As shown in FIGS. 2 to 4, the front section 3 is expanded and deployed rearward toward a dummy that imitates an occupant's head (hereinafter, referred to as a "dummy's head H"). The front section 3 in an expanded and deployed state forms a circular shape with a diameter which is larger than a lateral width of the dummy's head H when viewed from a side of the dummy's head H (c.f. FIG. 1A). Therefore, the front section 3 in an expanded and deployed state spreads over a range from diagonally forward left to diagonally forward right of the dummy's head H.

The left section 4 is expanded and deployed so as to project rearward from a left edge of the front section 3. The left section 4 in an expanded and deployed state forms an arc shape that protrudes leftward when viewed from the side of the dummy's head H (c.f. FIG. 1A).

The right section 5 is expanded and deployed so as to project rearward from a right edge of the front section 3. The right section 5 in an expanded and deployed state forms an arc shape that protrudes rightward when viewed from the side of the dummy's head H (c.f. FIG. 1A).

An upper end of the left section 4 is continuous with an upper end of the right section 5. A lower end of the left section 4 is continuous with a lower end of the right section 5. The left and right sections 4, 5 in an expanded and deployed state form a cylindrical wall as a whole. A rear end surface of the cylindrical wall is situated more rearward than a rear-side surface of the front section 3.

When the front surface of the dummy's head H is in contact with the front section 3, a dynamic friction coefficient μ' between the front surface of the dummy's head H and the front section 3 may be around 0.4, for example, although the value may depend on smoothness of the surface of the dummy's head H and the material of the bag body 2. The same description is applicable to a dynamic friction coefficient μ' between a left surface of the dummy's head H and the left section 4, and a dynamic friction coefficient μ' between a right surface of the dummy's head H and the right section 5.

Figure 5:
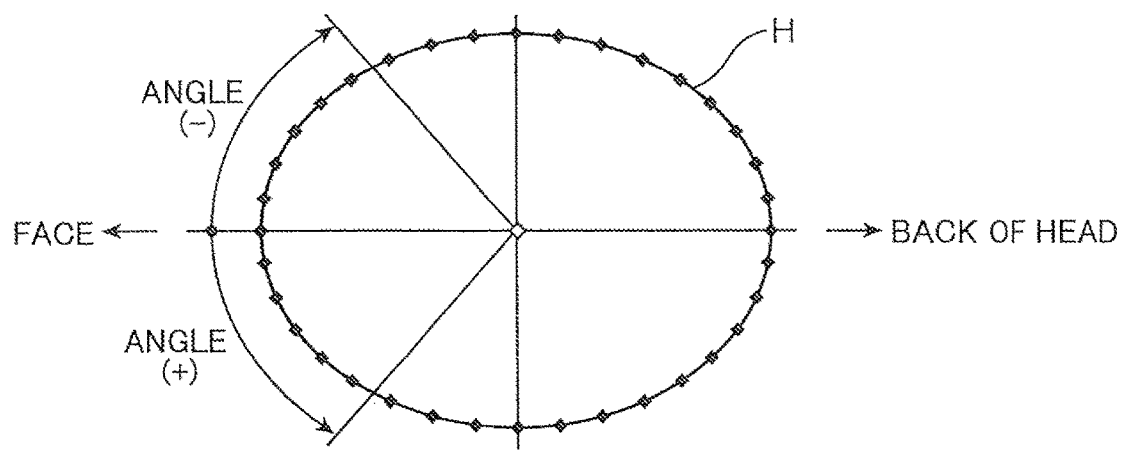
FIG. 5 is a diagram showing angular directions (positive and negative) around a vertical axis with a front of a head as a reference. Points in 10° increments of a central angle in a perfect circle are plotted in FIG. 5 around an elliptical occupant's head.
Figure 6:
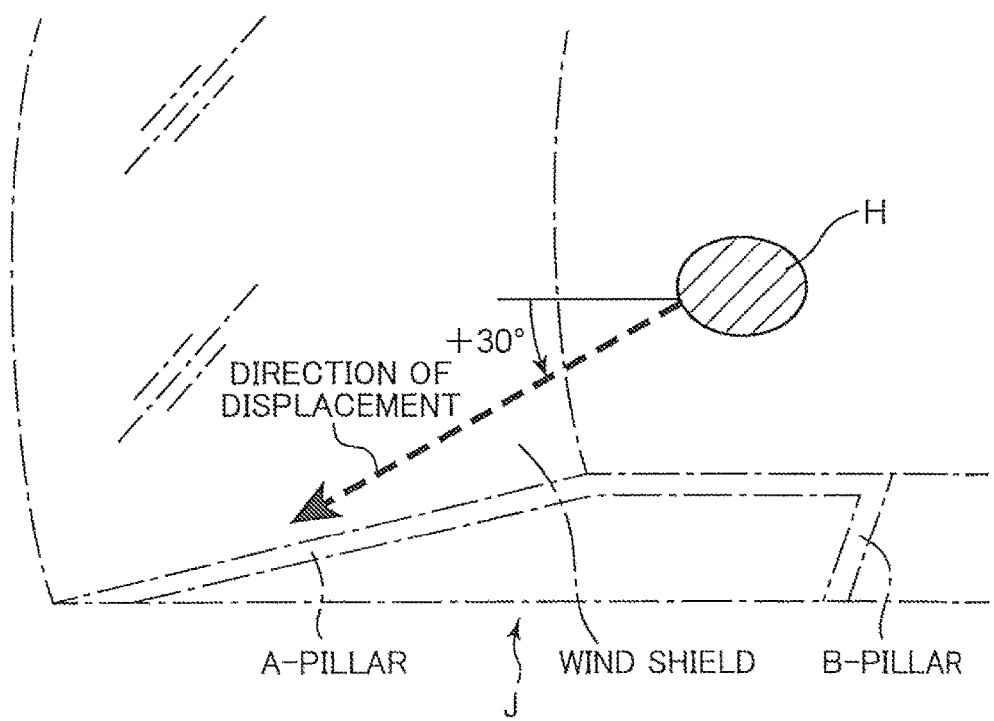
FIG. 6 is a diagram showing an exemplificative displacement direction of an occupant's head when another vehicle collides with a host vehicle.

As shown in FIGS. 5 and 6, the dummy's head H may have an elliptical shape when viewed from above, the elliptical shape has the long axis extending in the forward and rearward direction.

It is described in principle how to prevent the dummy's head H from rolling on a surface of the bag body 2 in an expanded and deployed state.

The following description puts a front direction of the vehicle as a reference, as shown in FIG. 5. Angles formed counterclockwise mean positive (+) angles (0° to +180°). Angles formed clockwise mean negative (−) angles (0° to −180°. A moment that causes a clockwise rotation of the dummy's head H around the vertical axis is a positive (+) moment. A moment that causes counterclockwise rotation of the dummy's head H around the vertical axis is a negative (−) moment.

Another vehicle may collide with a vehicle mounted with the airbag apparatus 1 (hereinafter, referred to as "host vehicle J": c.f. FIG. 6) from diagonally forward left. For example, when the other vehicle collides with the host vehicle from a+15° direction, the dummy's head H is displaced in a +30° direction (a direction of a dashed arrow in FIGS. 5 and 6). The direction in which the other vehicle collides is different from the direction in which the dummy's head H is displaced because the collision by the other vehicle causes a rotation of the host vehicle J. The aforementioned angular values of the collision direction and the displacement direction of the dummy's head H are merely examples. The angles are not particularly limited.

Figure 7:
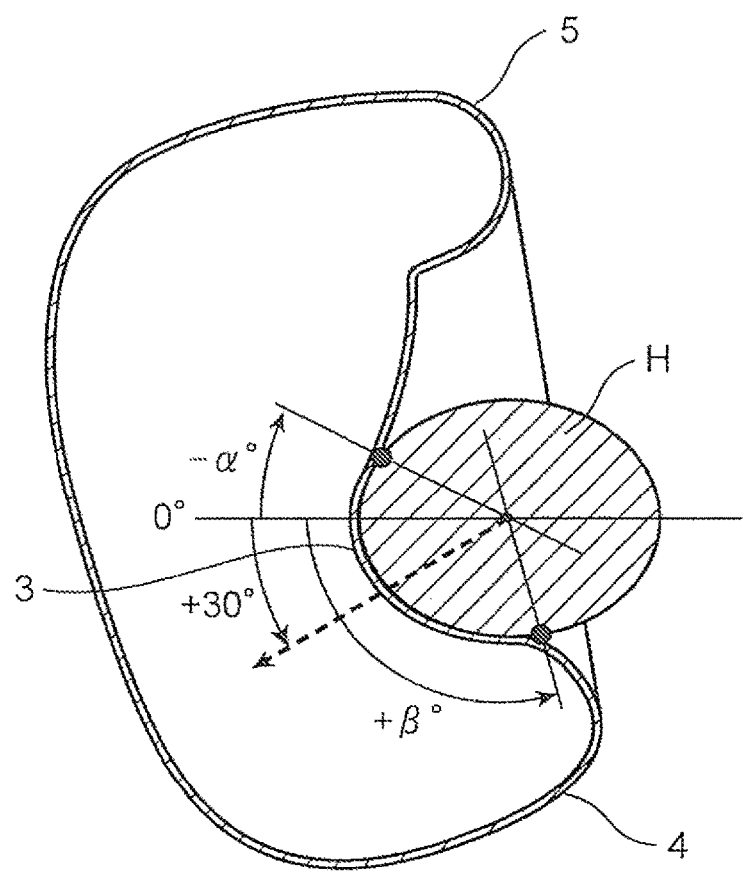
FIG. 7 is a sectional view which shows the expanded and deployed bag body according to the first embodiment of the present invention. An occupant's head has collided with the bag body.

As shown in FIG. 7, collision by the other vehicle causes a pushing state in which the front surface of the dummy's head H is displaced in diagonally forward left and pushes a surface of the front section 3. Meanwhile, the left surface of the dummy's head H pushes a surface of the left section 4. The dummy's head H may collide with the bag body 2 under a condition that the front direction of the dummy's head H is consistent with the front direction of the host vehicle J.

Figure 8:
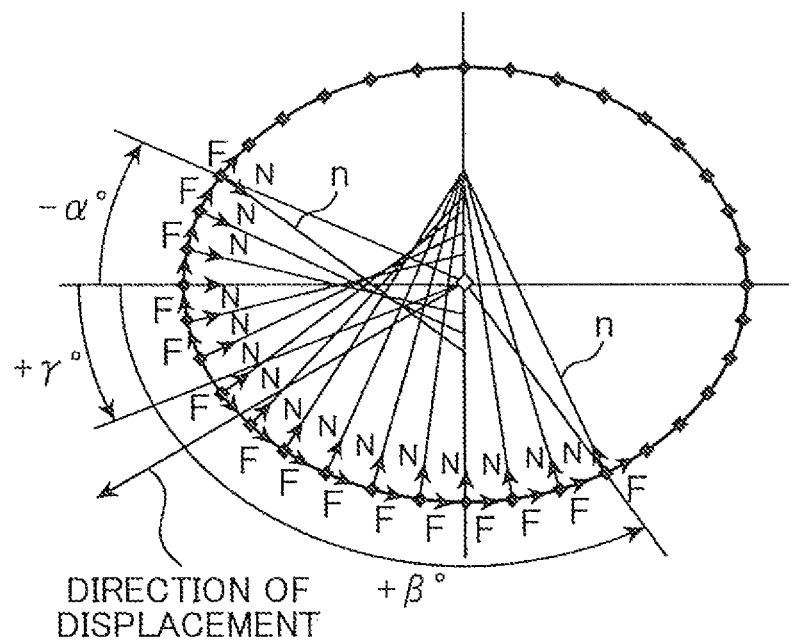
FIG. 8 is a diagram showing directions of a normal force and a dynamic friction force which act on each plotted point depicted in FIG. 5.

In this pushing state, the dummy's head H pushes the bag body 2 in a range between directions of −α° and +β°. α is larger than 0 but smaller than 90 (0<α<90). β is larger than 90 but smaller than 180 (90<β<180). In this pushing state, as shown in FIG. 8, the dummy's head H receives a normal force N from the surface of the bag body 2, the normal force N being a force in a direction perpendicular to the surface of the dummy's head H.

A direction of the normal force N depends on a position on the dummy's head H. With regard to the example shown in FIG. 8, if the direction of the normal force N is in a directional range not smaller than −α but smaller than 0° and in a directional range larger than 90° but not larger than +β°, the normal force N causes a counterclockwise rotation of the dummy's head H. On the other hand, if the direction of the normal force N is in a directional range larger than 0° but smaller than 90°, the normal force N causes a clockwise rotation of the dummy's head H. Therefore, when the other vehicle collides from diagonally forward left, the direction in which the normal force N causes a rotation of the dummy's head H is reversed near the front of the dummy's head H and near directly beside the dummy's head H.

Figure 9:
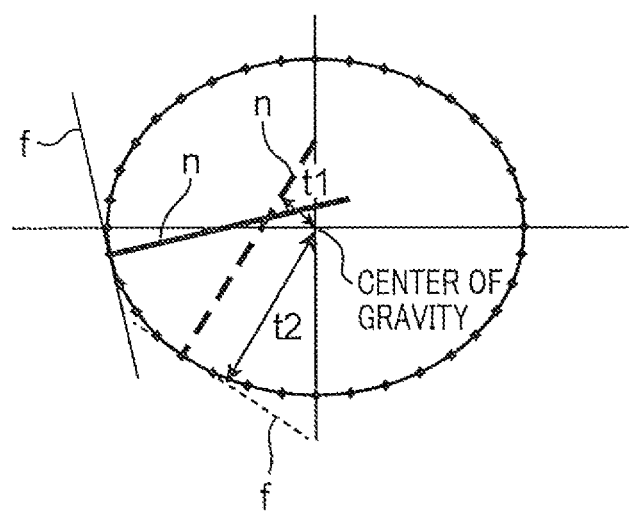
FIG. 9 is a diagram showing action lines of a normal force and a dynamic friction force generated at the plotted points depicted in FIG. 5 and a distance from each of the action lines to a center of gravity of an occupant's head (an arm length of a moment).

A distance t1 between an action line n of the normal force N and a center of gravity of the dummy's head H (c.f. FIG. 9) represents an arm length of a moment M1 that causes a rotation of the dummy's head H under the presence of the normal force N.

As shown in the following expression 1, the moment M1 may be expressed as a product of the normal force N and the arm length t1.

$$M1 = N \times t1 \tag{Expression 1}$$

As shown in FIG. 8, the dummy's head H receives a dynamic friction force F from the surface of the bag body 2. As shown in the following expression 2, the dynamic friction force F may be expressed as a product of the normal force N and the dynamic friction force μ'.

$$F = N \times \mu' \tag{Expression 2}$$

Figure 10A:
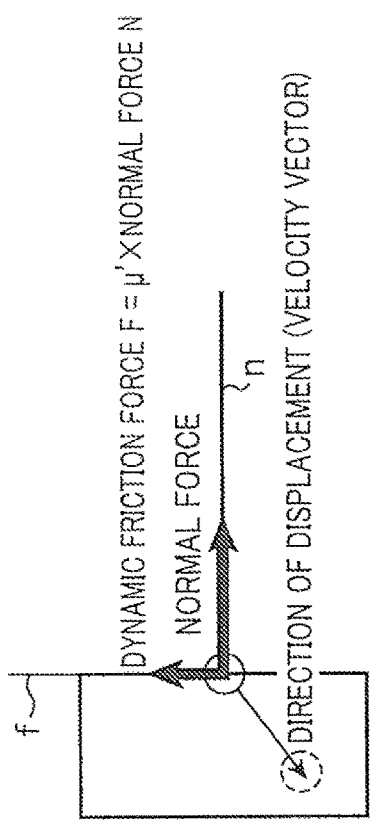
FIGS. 10A and 10B are diagrams showing a relationship among displacement directions of an occupant's head, a normal force and a dynamic friction force which act on the occupant's head.
Figure 10B:
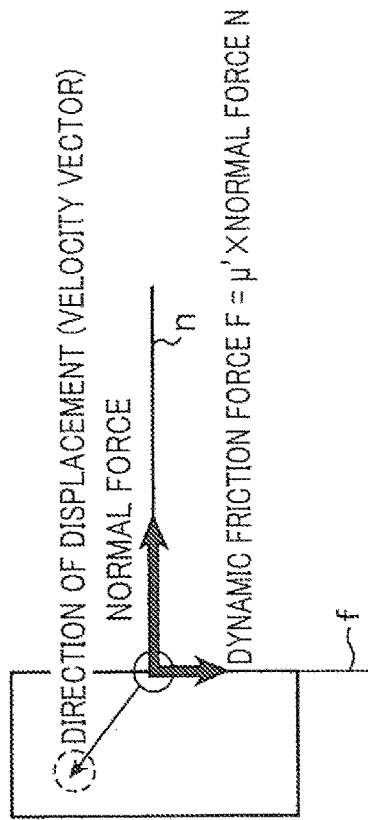

As shown in FIG. 8, a direction of the dynamic friction force F depends on a position on the dummy's head H. With regard to the example shown in FIG. 8, if the direction of the dynamic friction force F is in an angular range not smaller than −α° but smaller than +γ°, the dynamic friction force F causes a clockwise rotation of the dummy's head H. On the other hand, if the direction of the dynamic friction force F is in an angular range larger than +γ° but not larger than +β°, the dynamic friction force F causes a counterclockwise rotation of the dummy's head H. A direction in which the dynamic friction force F causes a rotation of the dummy's head H is reversed on either side of the +γ° direction. The +γ° direction is between directions of 0° and 90°. Therefore, the direction in which the dynamic friction force F causes a rotation of the dummy's head H is reversed year a boundary between the front and left sections 3, 4 when the other vehicle collides from diagonally forward left. As shown in FIG. 10, the directional reversal of the dynamic friction force F depends on whether the displacement direction of the dummy's head H is on the right (c.f. FIG. 10A) or left (c.f. FIG. 10B) of the action line n of the normal force N.

A distance t2 between an action line f of the dynamic friction force F and the center of gravity of the dummy's head H represents an arm length of a moment M2 that causes a rotation of the dummy's head H under the presence of the dynamic friction force F.

As shown in the following expression 3, the moment M2 may be expressed as a product of the dynamic friction force F and the arm length t2.

$$M2 = F \times t2 \tag{Expression 3}$$

As shown in FIG. 11, the moment M1 (depicted by a solid line) caused by the normal force N is a negative moment in an angular range larger than −α° but smaller than 0° and in an angular range larger than 90° but smaller than 180°. On the other hand, the moment M1 is a positive moment in an angular range larger than 0° but smaller than 90°.

The moment M2 (depicted by a dashed-dotted line) caused by the dynamic friction force F is a positive moment in an angular range not smaller than −α° and smaller than γ°. On the other hand, the moment M2 is a negative moment in an angular range larger than γ° but not larger than 180°.

A sum S (depicted by a dashed line) of the moment M1 and the moment M2 is a positive moment in an angular range not smaller than −α° but smaller than γ°. On the other hand, the sum S is a negative moment in an angular range larger than γ° but not larger than 180°.

Figure 12:
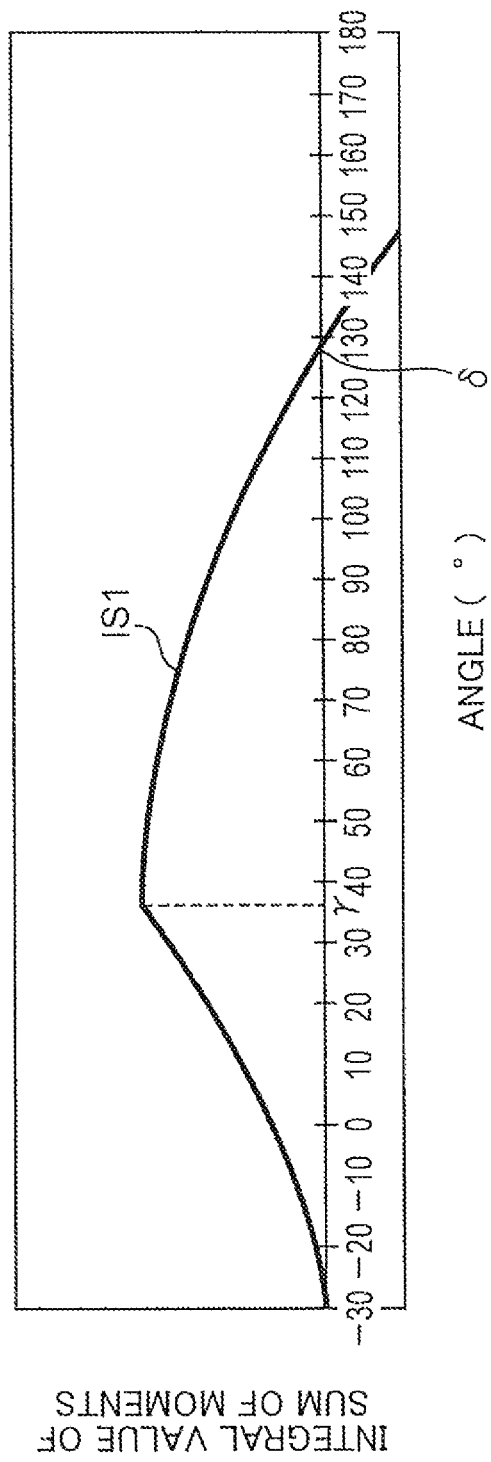
FIG. 12 is a graph showing integral values of the sum of the moments shown in FIG. 11.

A summation of moments (an integral value IS1) is obtained when the sum S of the moment M1 and the moment M2 shown in FIG. 11 is integrated in a direction where the angle increases from −α°. As shown in FIG. 12, the integral value IS1 becomes a maximum value at γ° and becomes 0 at δ°. δ is larger than 90 but smaller than 180 (in the example shown in FIG. 12, approximately 130).

In short, if the dummy's head H pushes the bag body 2 in a range from −α° to δ° (if β in FIG. 7 is equal to δ), the summation of moments which act on the dummy's head H becomes zero so that rotation (rolling) of the dummy's head H may be prevented. Even if the summation of moments does not become zero, rotation of the dummy's head H may be prevented if the dummy's head H pushes the bag body 2 in a range where the summation of moments approaches zero (if β is close to δ).

Figure 13:
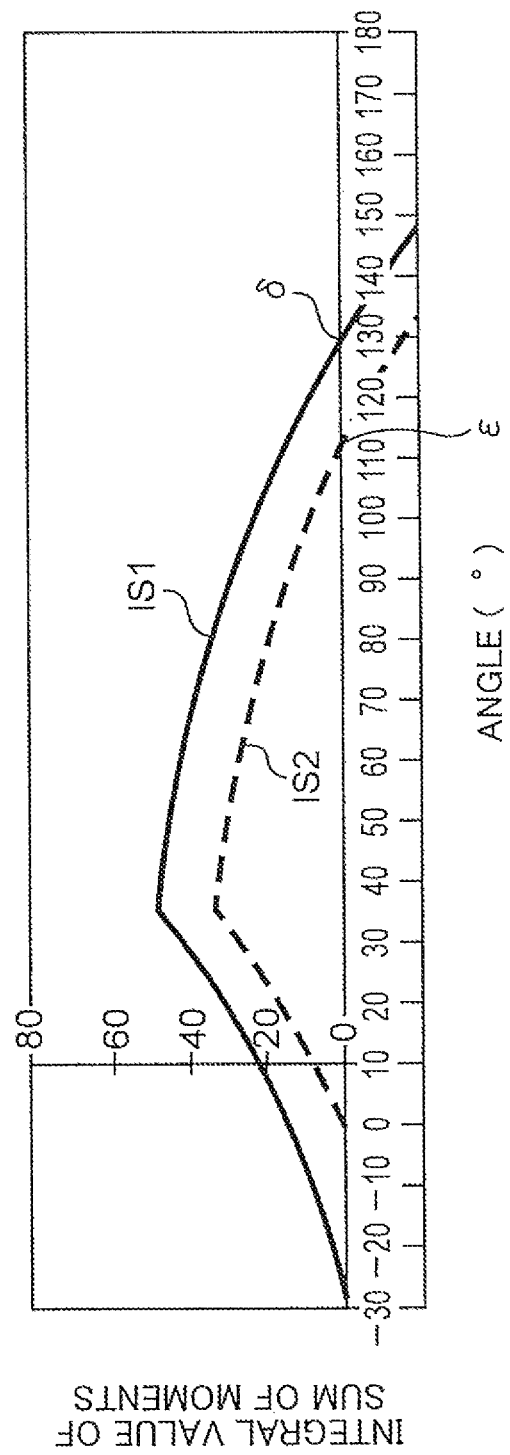
FIG. 13 is a graph showing integral values obtained when a range of contact between an occupant's head and a bag body is different from the graph shown in FIG. 12.

The range in which the dummy's head H pushes the bag body 2 is not limited to the range shown in FIG. 8. For example, when the dummy's head H pushes the bag body 2 from 0°, as shown in FIG. 13, the summation of moments (an integral value IS2) becomes 0 at ε° that is smaller than δ°. Even in this case, a rotation may be less likely to happen to the dummy's head H. In the example shown in FIG. 13, ε is approximately 110.

The aforementioned description shows the host vehicle S receiving an impact from diagonally forward left. A similar description is applicable to the host vehicle J receiving an impact from diagonally forward right.

As described above, according to the present embodiment, for example, when the host vehicle J receives an impact from diagonally forward left, the bag body 2 is expanded and deployed to make the dummy's head in a pushing state in which the front surface of the dummy's head H pushes the surface of the front section 3. Meanwhile, the left surface of the dummy's head H pushes the surface of the left section 4. In the pushing state, a normal force N and a dynamic friction force F cause a rightward moment to turn the dummy's head H clockwise when the normal force N and the dynamic friction force F are received by a front surface of the dummy's head H front a surface of the front section 3. Meanwhile, a normal force N and a dynamic friction force F cause a leftward moment to turn the dummy's head H counterclockwise when the normal force N and the dynamic friction force F are received by a left surface of the dummy's head H from a surface of the left section 4. Since the leftward moment and the rightward moment cancel each other out, the dummy's head H may be less likely to roll on the surface of the bag body 2.

When the host vehicle J receives an impact from diagonally forward right, the bag body 2 is expanded and deployed to make the dummy's head in a pushing state in which the front surface of the dummy's head H pushes the surface of the front section 3. Meanwhile, the right surface of the dummy's head H pushes a surface of the right section 5. In the pushing state, a normal force N and a dynamic friction force F cause a leftward moment to turn the dummy's head H counterclockwise when the normal force N and the dynamic friction force F are received by the front surface of the dummy's head H from the surface of the front section 3. Meanwhile, a normal force N and a dynamic friction force F cause a rightward moment to turn the dummy's head H clockwise when the normal force N and the dynamic friction force F are received by a right surface of the dummy's head H from a surface of the right section 5. Since the leftward moment and the rightward moment cancel each other out, the dummy's head H is less likely to roll on the surface of the bag body 2.

According to the present embodiment, the left and right sections 3, 4 are continuous to each other to form a ring as a whole in an expanded and deployed state. Therefore, when an external force acts on the left or right section 4, 5 in an expanded and deployed state, stress is distributed over the entire left and right sections 4, 5. Accordingly, for example, when the dummy's head H collides with the left section 4 in an expanded and deployed state, excessive deformation may be less likely to happen to the left section 4. Consequently, the leftward moment may become large enough to surely prevent the dummy's head H from rolling on the surface of the bag body 2.

Modification of First Embodiment

Figure 14A:
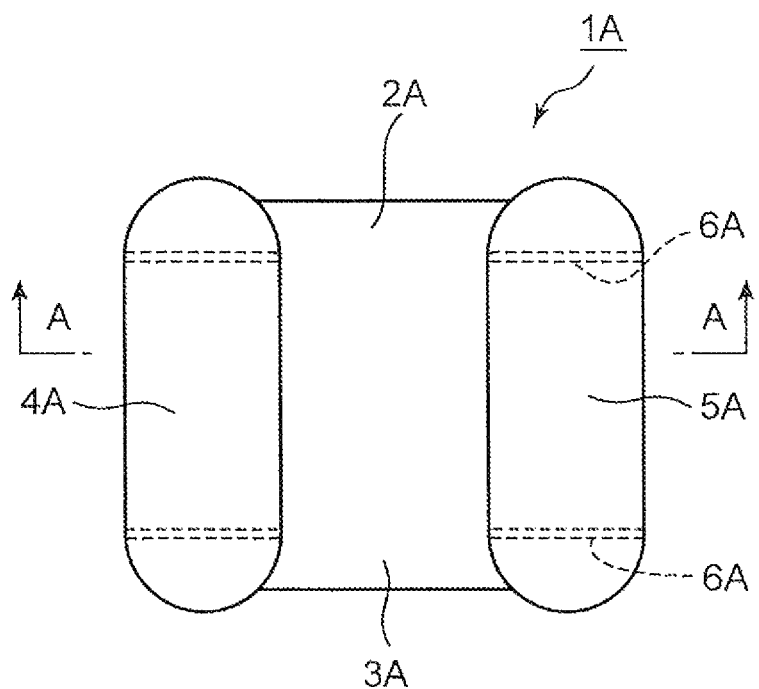
FIGS. 14A and 14B are diagrams showing a configuration of a bag body according to a modification of the first embodiment of the present invention.
Figure 14B:
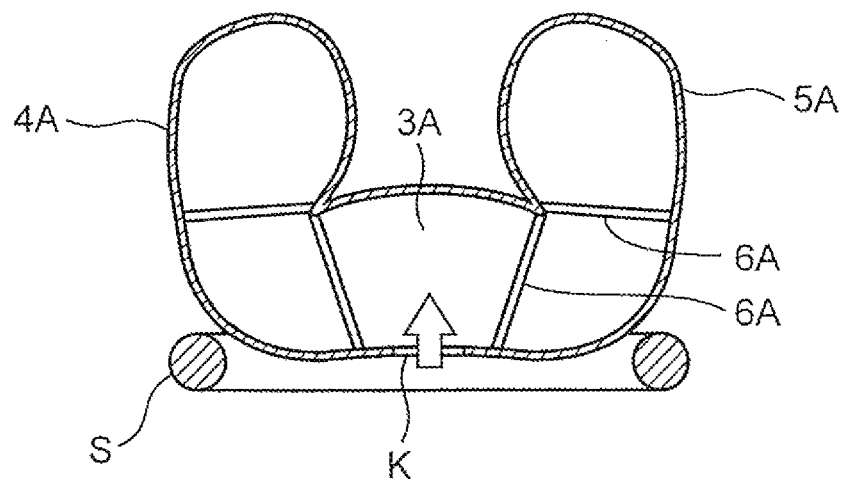

An airbag apparatus 1A according to a modification of the first embodiment described with reference to FIG. 14.

A bag body 2A of the airbag apparatus 1A includes a front section 3A, a left section 4A and a right section 5A.

The front section 3A in an expanded and deployed state forms a square shape with a lateral width that is larger than a lateral width of the dummy's head H when viewed from a side of the dummy's head H (rearward). Therefore, the front section 3A in an expanded and deployed state spreads over a range from diagonally forward left to diagonally forward right of the dummy's head H.

The left section 4A is expanded and deployed so as to project rearward from a left edge of the front section 3A. The left section 4A in an expanded and deployed state forms a straight line shape that extends vertically when viewed from the side of the dummy's head H.

The right section 5A is expanded and deployed so as to project rearward from a right edge of the front section 3A. The right section 5A in an expanded and deployed state forms a straight line shape that extends vertically when viewed from the side of the dummy's head H.

The left and right sections 4A, 5A are coupled to each other via the front section 3A.

Expanded and deployed shapes of the left and right sections 4A, 5A are retained by shape retaining tethers 6A.

According to the present modification, the left and right sections 4A, 5A extend linearly and vertically. Since a side surface of the dummy's head H is often planar in the vertical direction, a wide range of the side surface of the dummy's head H may be brought into contact with the left or right section 4A, 5A. Therefore, there may be a sufficient reduction in a summation of moments which act on the dummy's head H to reliably prevent the dummy's head H from rolling on the surface of the bag body 2A.

Second Embodiment

Figure 16:
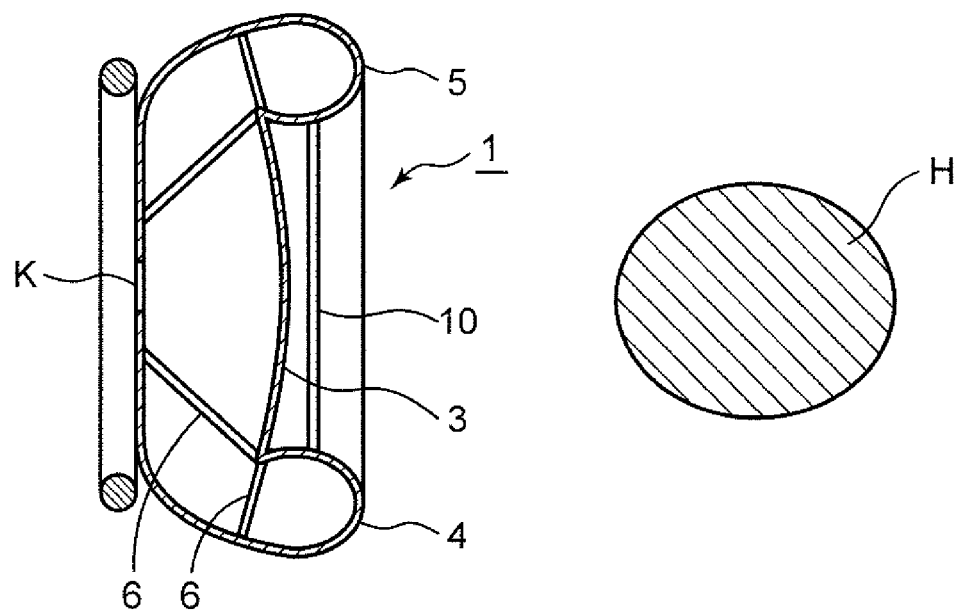
FIG. 16 is a sectional view of the bag body according to the second embodiment of the present invention before an occupant's head collides with the expanded and deployed bag body.
Figure 17:
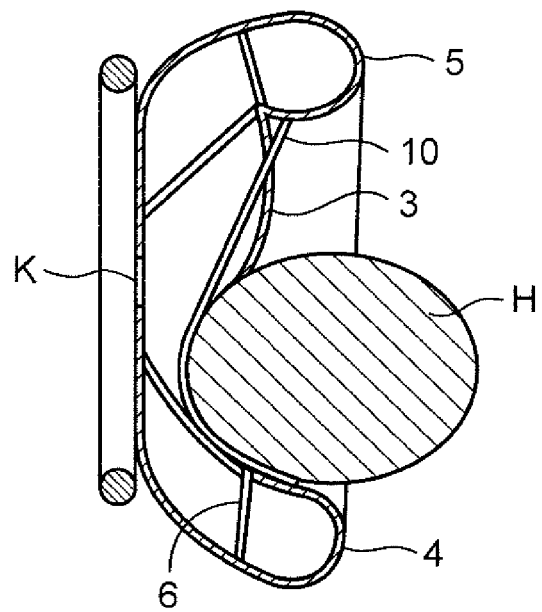
FIG. 17 is a sectional view of the bag body according to the second embodiment of the present invention after an occupant's head collides with the bag body which is expanded and deployed.

An airbag apparatus 1B according to the second embodiment is described with reference to FIGS. 15 to 17. Components similar to those of the first embodiment are denoted by the same reference characters. A description thereof is omitted.

Figure 15A:
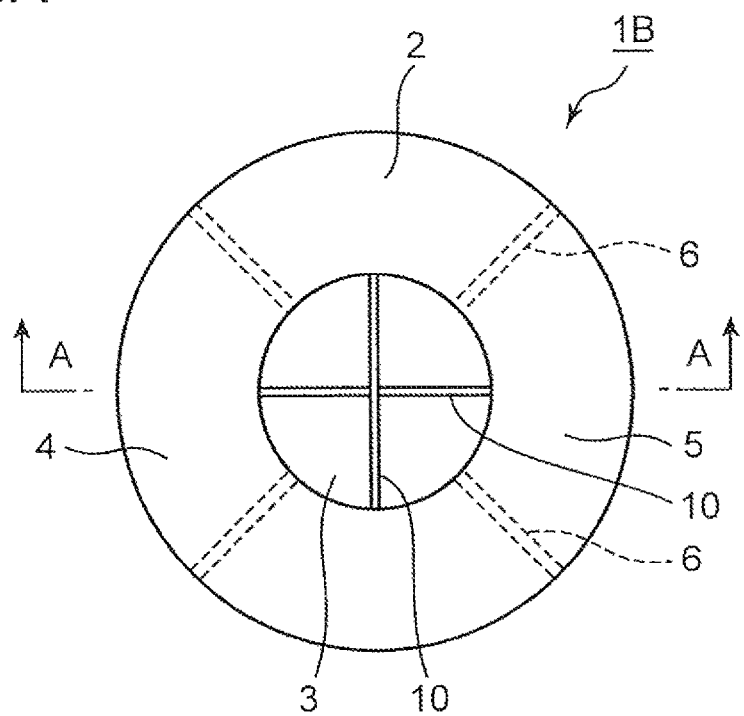
FIGS. 15A and 15B are diagrams showing a configuration of a bag body according to the second embodiment of the present invention.
Figure 15B:
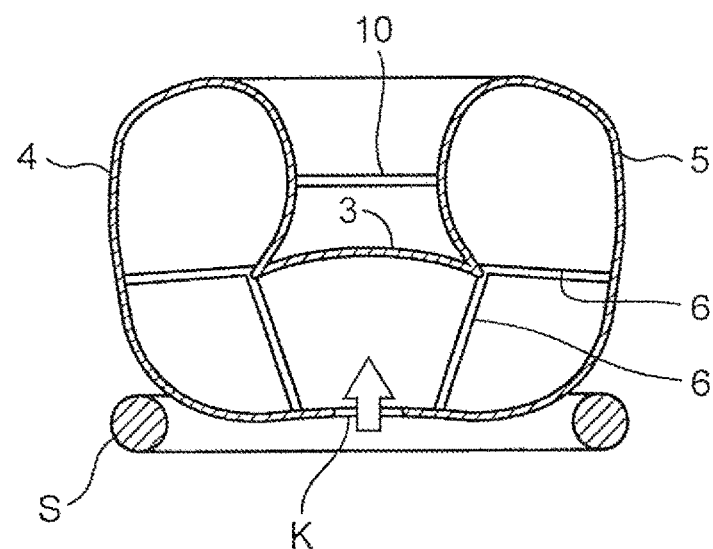

As shown in FIG. 15, the airbag apparatus 1B includes coupling tethers 10. The coupling tethers 10 couple the left and right sections 4, 5 with each other. As shown in FIG. 16, the coupling tethers 10 are situated at a rear side of the front section 3 in an expanded and deployed state of the bag body 2.

For example, the coupling tethers 10 may have a string shape as shown in FIG. 15 or may have a band shape. For example, as shown in FIG. 15, one of the coupling tethers 10 may couple central portions of the left and right sections 4, 5 with each other whereas the other of the coupling tethers 10 intersects the one of the coupling tethers 10 and couples upper boundary portions of the left and right sections 4, 5 to lower boundary portions of the left and right sections 4, 5 so that the coupling tethers 10 form a cross shape.

According to the present embodiment, expanded and deployed shapes of the left and right sections 4, 5 may be retained more reliably by the coupling tethers 10. As shown in FIGS. 16 and 17, when the dummy's head H enters between the left and right sections 4, 5, the dummy's head H pushes the coupling tethers 10 inward. Consequently, since the left and right sections 4, 5 are pulled by the coupling tethers 10 and deform toward the dummy's head H, the left and right sections 4, 5 may protect the dummy's head H so as to enclose the dummy's head H leftward and rightward.

Modification of Second Embodiment

An airbag apparatus 1C according to a modification of the second embodiment is described with reference to FIG. 18. Components similar to those of the modification of the first embodiment are denoted by the same reference characters. A description thereof is omitted.

Figure 18A:
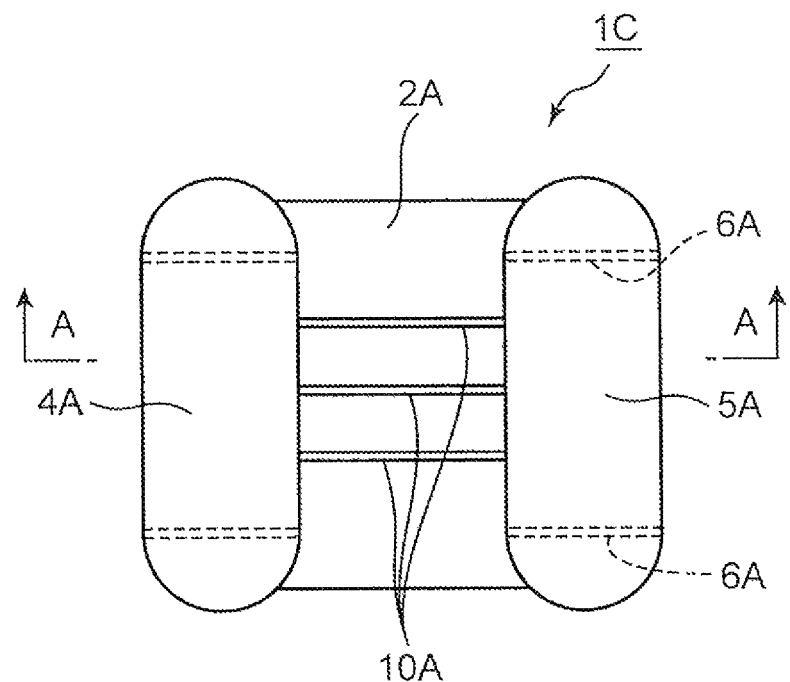
FIGS. 18A and 18B are diagrams showing a configuration of a bag body according to a modification of the second embodiment of the present invention.
Figure 18B:
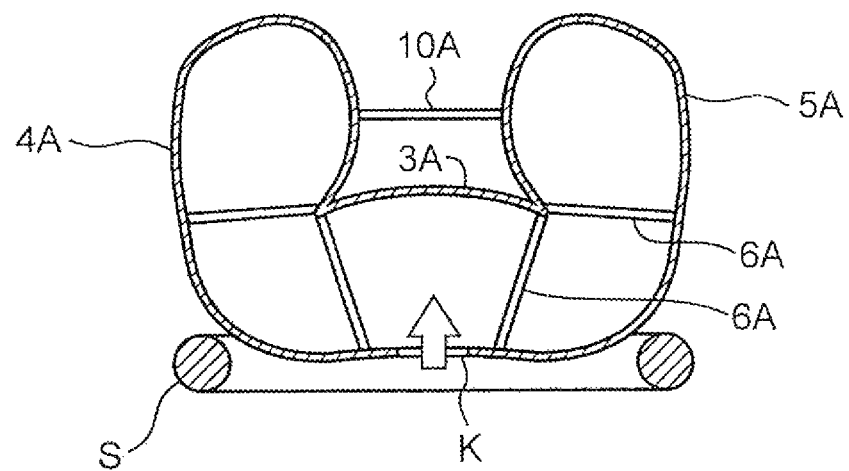

As shown in FIG. 18, the airbag apparatus 1C includes coupling tethers 10A. The coupling tethers 10A couple the left section 4A to the right sections 5A. The coupling tethers 10A are situated at a rear side of the front section 3A in an expanded and deployed state of the bag body 2A.

For example, each of the coupling tethers 10A may have a string shape as shown in FIG. 18 or may have a band shape. For example, as shown in FIG. 18, the coupling tethers 10A may couple a central portion of the left section 4 to a central portion of the right sections 5 at different heights.

According to the present embodiment, expanded and deployed shapes of the left and right sections 4A, 5A may be retained more reliably by the coupling tethers 10A. When the dummy's head H enters between the left and right sections 4A, 5A, the dummy's bead H pushes the coupling tethers 10A inward. Consequently, since the left and right sections 4A, 5A are pulled by the coupling tethers 10A and deform toward the dummy's head H, the left and right sections 4A, 5A may protect the dummy's head H so as to enclose the dummy's head H leftward and rightward.

Third Embodiment

An airbag apparatus 1D according to a modification of the third embodiment is described with reference to FIG. 19.

Figure 19A:
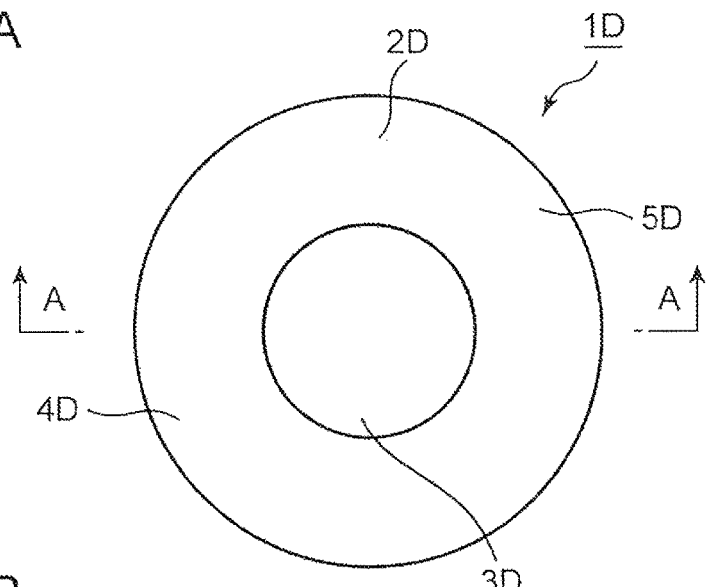
FIGS. 19A to 19C are diagrams showing a configuration of a bag body according to the third embodiment of the present invention.

As shown in FIG. 19 a left section 4D of the airbag apparatus 1D is expanded and deployed so as to project rearward from a left edge of a front section 3D. The left section 4D in an expanded and deployed state forms an arc shape that protrudes leftward when viewed from the side of the dummy's head H.

A right section 5D is expanded and deployed so as to project rearward from a right edge of the front section 3D. The right section 5D in an expanded and deployed state forms an arc shape that protrudes rightward when viewed from the side of the dummy's head H.

Upper ends of the left and right sections 4D, 5D are continuous with each other. Lower ends of the left and right sections 4D, 5D are continuous with each other. In an expanded and deployed state, the left and right sections 4D, 5D form a ring-like wall as a whole. A rear end of the ring-like wall is situated more rearward than a rear surface of the front section 3D.

Figure 19B:
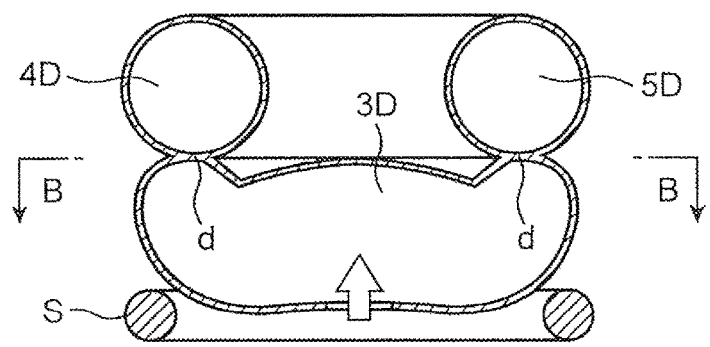
Figure 19C:
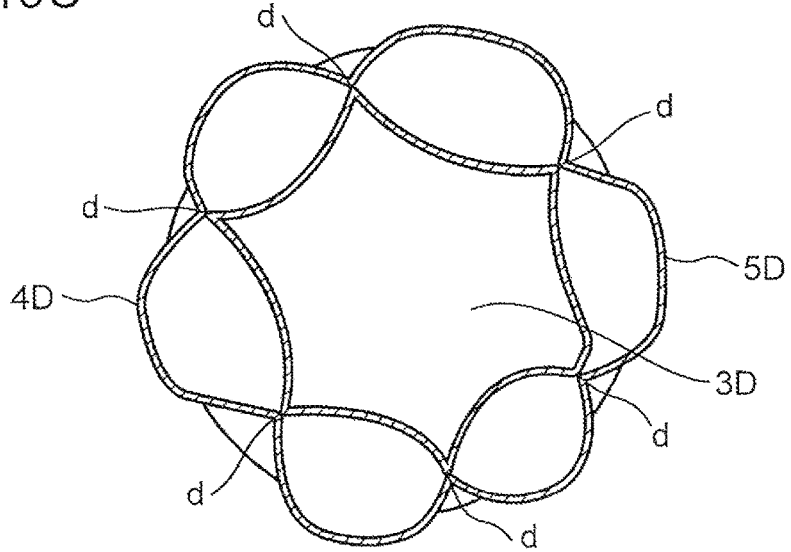

As shown in FIGS. 19B and 19C, a bag body 2D includes outer fabric, which forms an outer circumferential arc of the left section 4D, and inner fabric, which forms an inner circumferential arc of the left section 4D. The outer fabric and the inner fabric are partially coupled to each other on a side of the front section 3D (coupling section d). Outer fabric forms an outer circumferential arc of the right section 4D whereas inner fabric forms an inner circumferential arc of the right section 4D. The outer fabric and the inner fabric are partially coupled to each other on the side of the front section 3D. With regard to the example shown in FIG. 19C, the outer fabric and the inner fabric are coupled to each other at constant intervals in a circumferential direction in the left and right sections 4, 5. Although a coupling method is not particularly limited, for example, these fabrics may be sewn together or may be bonded to each other with adhesive.

The inside of the left and right sections 4D, 5D is communicated with the inside of the front section 3D at positions without coupling of the outer fabric to the inner fabric.

According to the present embodiment, each of the left and right sections 4D, 5D includes outer fabric forming an outer circumferential arc and inner fabric forming an inner circumferential arc. The outer fabric and the inner fabric are partially coupled to each other. Therefore, an expanded and deployed shape of the bag body 2D may he retained without shape retaining tethers.

Fourth Embodiment

Figure 20:
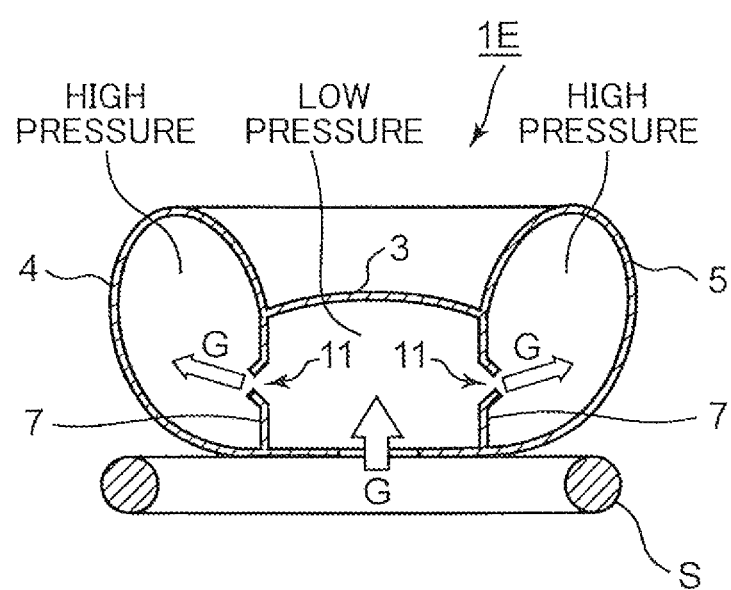
FIG. 20 is a sectional view showing a configuration of a bag body according to the fourth embodiment of the present invention.

An airbag apparatus 1E according to the fourth embodiment is described with reference to FIG. 20. Components similar to those of the first embodiment are denoted by the same reference characters as in FIG. 1. A description thereof is omitted.

The airbag apparatus 1E includes partition walls 7 between the front and left sections 3, 4 and between the front and right sections 3, 5. Check valves 11 are provided on the partition walls 7. The check valves 11 maintain directions in which the expansion gas G flows from the front section 3 toward the left and right sections 4. Therefore, the expansion gas G entering the left and right sections 4, 5 is prevented from flowing hack into the front section 3.

Figure 21:
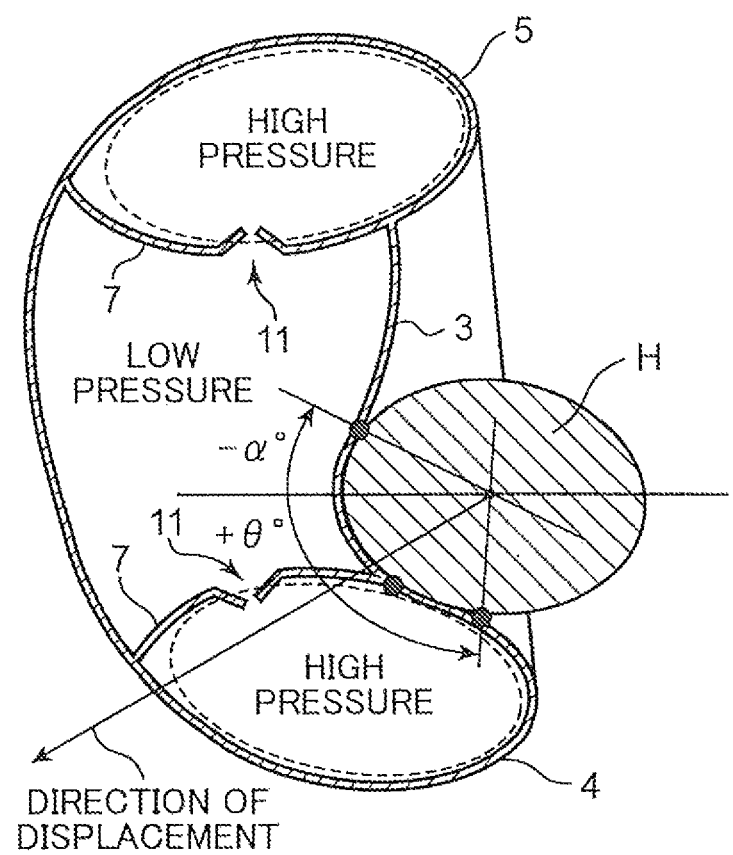
FIG. 21 is a sectional view of the bag body according to the fourth embodiment of the present invention when an occupant's head collides with the bag body which is expanded and deployed.

In such a configuration, when the expansion gas G is supplied into the front section 3, internal pressure in the left and right sections 4, 5 becomes higher than internal pressure in the front section 3 (c.f. FIGS. 20 and 21).

Figure 22:
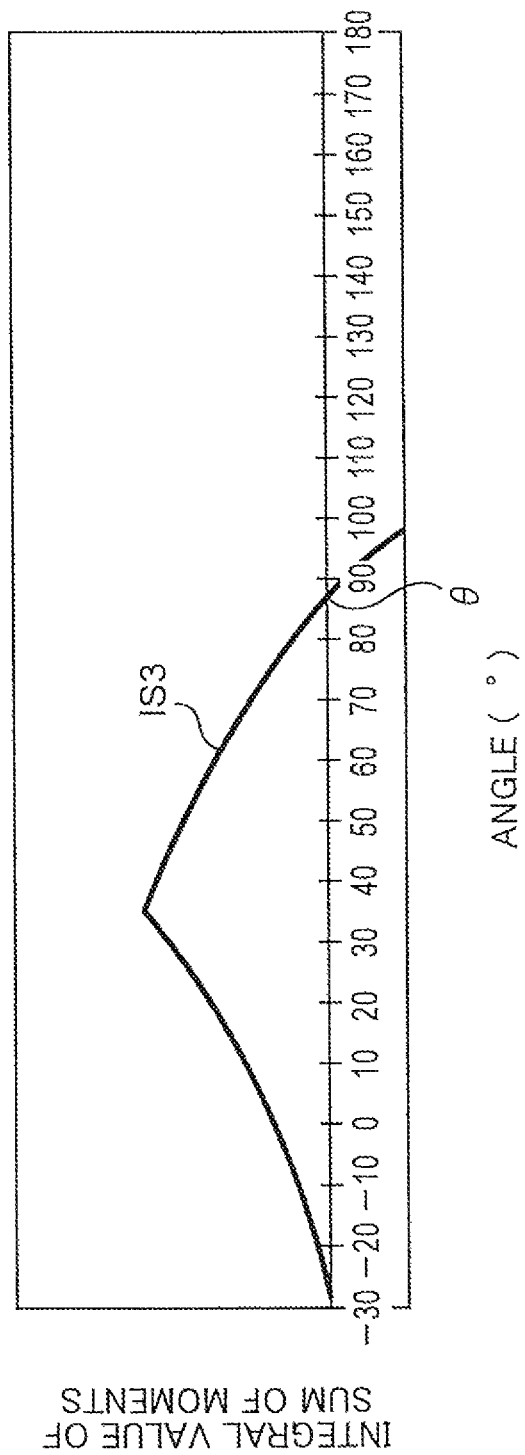
FIG. 22 is a graph showing integral values of a sum of moments which act on an occupant's head in the fourth embodiment of the present invention.

According to the present embodiment, since the internal pressure in the left and right sections 4, 5 becomes higher than the internal pressure in the front section 3, there is an increase in contact pressure between the left or right section 4, 5 and the dummy's head H. This means an increase in the dynamic friction force F between the left or right section 4, 5 and the dummy's head H. Therefore, even if the left and right sections 4, 5 have short lengths to cause a narrow contact range between the left or right section 4, 5 and the dummy's head H, a leftward moment and a rightward moment may be balanced. For example, as shown in FIG. 21, if the dummy's head H pushes the bag body 2 in a range from $-\alpha°$ to $0°$, the summation of moments which act on the dummy's head H (an integral value IS3) becomes zero (c.f. FIG. 22) to prevent rotation (rolling) of the dummy's head H. $\theta$ is smaller than $\delta$ shown in FIG. 12. Therefore, the left and right sections 4, 5 may have smaller sizes.

Figure 23:
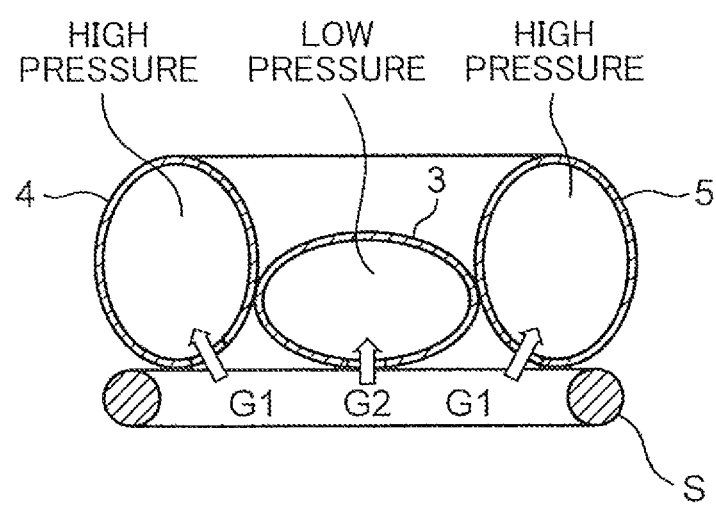
FIG. 23 is a sectional view showing a configuration of a bag body according to a modification of the fourth embodiment of the present invention.

A method of setting internal pressure in the left and right sections 4, 5 higher than the internal pressure in the front section 3 is not limited to the example described in the fourth embodiment. For example, as shown in FIG. 23, there may be a first gas generator (not shown) which supplies expansion gas G1 to the left and right sections 4, 5 and a second gas generator (not shown) which supplies expansion gas G2 to the front section 3. In this case, pressure of the expansion gas G1 may become higher than pressure of the expansion gas G2.

Fifth Embodiment

Figure 24A:
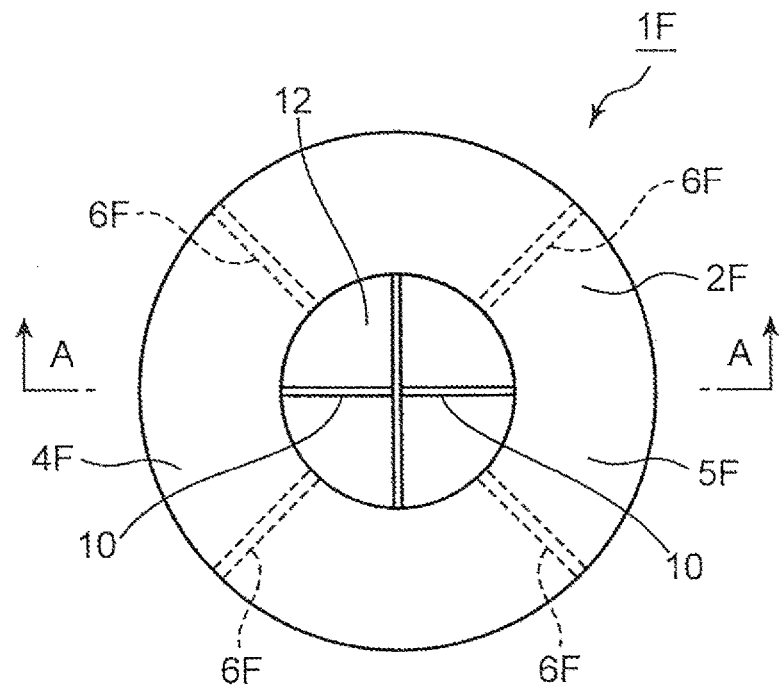
FIGS. 24A and 24B are diagrams showing a configuration of a bag body according to the fifth embodiment of the present invention.
Figure 24B:
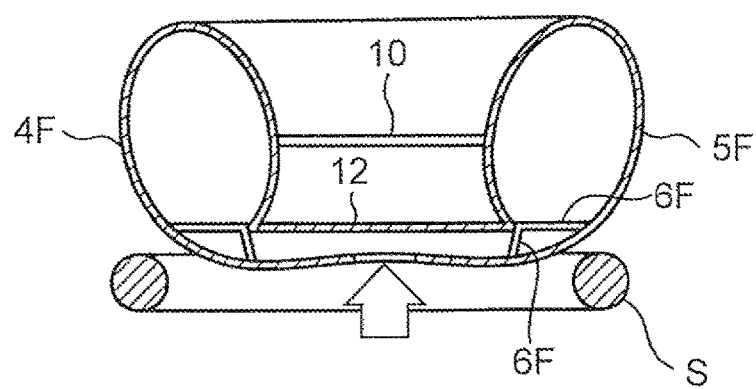

An airbag apparatus 1F according to the fifth embodiment is described with reference to FIG. 24. Components similar to those of the second embodiment are denoted by the same reference characters as in FIG. 15. A description thereof is omitted.

The airbag apparatus 1F includes a base 12, a left section 4F, a right section 5F, shape retaining tethers 6F, and the coupling tethers 10 but does not include a front section.

The base 12 is provided over a range from diagonally forward left to diagonally forward right of the dummy's head H. The base 12 guides expansion gas to the left and right sections 4F, 5F. The base 12 is thinner than the front section 3 (c.f FIG. 15) in an expanded and deployed state.

The left section 4F is expanded and deployed so as to project rearward from a left edge of the has 12.

The right section 5F is expanded and deployed so as to project rearward from a right edge of the base 12.

With regard to the airbag apparatus 1F, for example, when the host vehicle J receives an impact from diagonally forward right, the dummy's head H is displaced diagonally forward left. Meanwhile, a bag body 2F is expanded and deployed to make the dummy's head H in a pushing state, in which the front surface of the dummy's head H pushes a surface of the coupling tethers 10 while the left surface of the dummy's head pushes the surface of the left section 4F.

In the pushing state, a normal force and a dynamic friction force cause a rightward moment to turn the dummy's head H clockwise when the normal force and the dynamic friction force are received by the front surface of the dummy's head from a surface of the coupling tethers 10. A normal force and a dynamic friction force cause a leftward moment to turn the dummy's head H counterclockwise when the normal force and the dynamic friction force are received by the left surface of the dummy's head H from the surface of the left section 4F.

The coupling tether 10 and the hag body 2F in an expanded and deployed state have a contact range in contact with the dummy's head H, the contact range being set so that an integral value of a sum of the leftward moment and the rightward moment approaches zero. The dummy's head H may be less likely to roll on the surfaces of the bag body 2F and the coupling tether 10.

Likewise, the dummy's bead H may be less likely to roll on the surfaces of the bag body 2F and the coupling tethers 10 when the host vehicle J receives an impact from diagonally forward right.

Sixth Embodiment

Figure 25A:
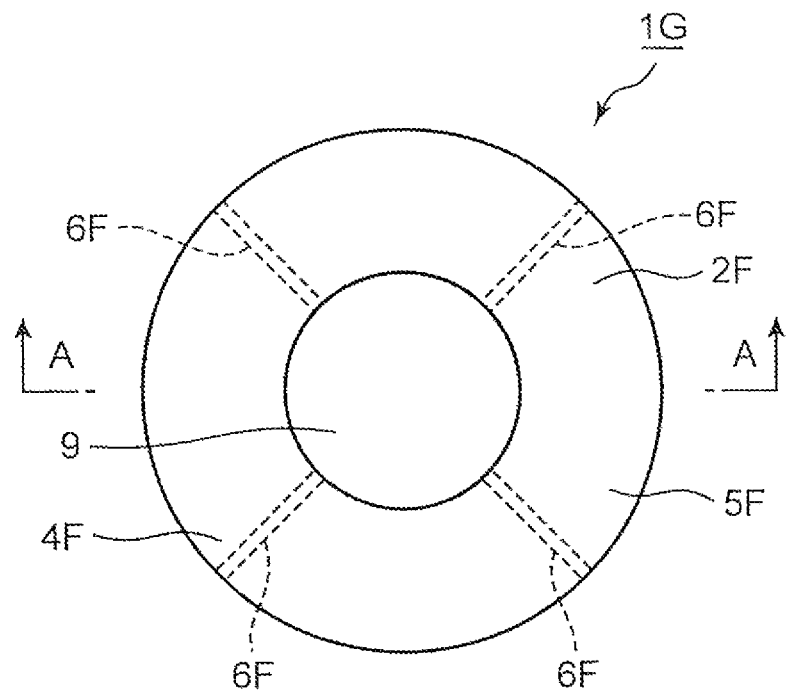
FIGS. 25A and 25B are diagrams showing a configuration of a bag body according to the sixth embodiment of the present invention.
Figure 25B:
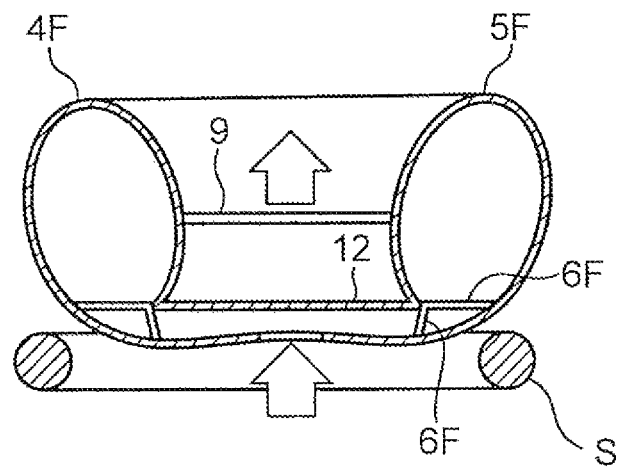

An airbag apparatus 1G according to the sixth embodiment is described with reference to FIG. 25. Components similar to those of the fifth embodiment are denoted by the same reference characters as in FIG. 24. A description thereof is omitted.

The airbag apparatus 1G includes the base 12, the left section 4F, the right section 5F, the shape retaining tethers 6F, and a lid 9 but does not include a coupling tether.

The lid 9 is a disk-like cover provided on an opening of a storage chamber in which a bag body 2G is stored. When the bag body 2F is expanded and deployed, the lid 9 is retained between the left and right sections 4F, 5F. Meanwhile, the lid 9 is situated at a rear side of the base 12. The lid 9 is situated in front of rear ends of the left and right sections 4F, 5F.

With regard to the airbag apparatus 1G, for example, the dummy's head H is displaced diagonally forward left when the host vehicle receives an impact from diagonally forward left. Meanwhile, the bag body 2F is expanded and deployed to make the dummy's head H in a pushing state, in which the front surface of the dummy's head H pushes a surface of the lid 9 while the left surface of the dummy's head H pushes the surface of the left section 4F.

In the pushing state, a normal force and a dynamic friction force cause a rightward moment to turn the dummy's head H clockwise when the normal force and the dynamic friction force are received by a front surface of the dummy's head H from a surface of the lid 9. Meanwhile, a normal force and a dynamic friction force cause a leftward moment to turn the dummy's head H counterclockwise when the normal force and the dynamic friction force are received by a left surface of the dummy's head H from a surface of the left section 4F.

The lid 9 and the bag body 2F in an expanded and deployed state may include a contact range in contact with the dummy's head H, the contact range being set so that an integral value of a sum of the leftward moment and the rightward moment approaches zero. The dummy's head H may be less likely to roll on the surfaces of the bag body 2F and the lid 9.

Likewise, the dummy's head H may be less likely to roll on the surfaces of the bag body 2F and the lid 9 when the host vehicle J receives an impact from diagonally forward right.

Other Embodiments

While an airbag apparatus is provided inside the steering wheel S that is situated in front of the driver's seat in the aforementioned embodiments. This configuration is not restrictive. For example, an airbag apparatus may be provided inside an instrument panel P (c.f. FIG. 2) that is situated in front of the driver's seat or may be provided on a rear surface of a seat back SB.

Summary of Embodiments

There is a summary about unique features disclosed in the aforementioned embodiments and effects resulting from the unique features.

The airbag apparatus disclosed in the aforementioned embodiments is used for a vehicle. The airbag includes a bag body which is expanded and deployed by expansion gas supplied when the vehicle receives an external impact. The bag body includes a front section which is expanded and deployed rearward in a range from diagonally forward left to diagonally forward right of an occupant's head; a left section which is expanded and deployed so as to project rearward from a left edge of the front section; and a right section which is expanded and deployed so as to project rearward from a right edge of the front section. The bag body s expanded and deployed to make the occupant's head in a pushing state then the vehicle diagonally receives an impact from front so that the occupant's head is displaced diagonally forward. Meanwhile, a front surface of the occupant's head pushes a surface of the front section whereas a side surface of the occupant's head pushes a surface of the left or right section. A normal force and a dynamic friction force cause a first directional moment to turn the occupant's head in a first direction when the front surface of the occupant's head receives the normal force and the dynamic friction force from the surface of the front section under the pushing state. A second directional moment acts to turn the occupant's head in a second direction opposite to the first direction. The second directional moment is caused by a normal force and a dynamic friction force which the side surface of the occupant's head receives from the surface of the left or right section.

According to this configuration, the hag body is expanded and deployed to make the occupant's head in a pushing state when a vehicle diagonally receives an impact from front. The front surface of the occupant's head pushes a surface of the front section whereas the side surface of the occupant's head pushes a surface of the left or right section under the pushing state. A normal three and a dynamic friction force cause a first directional moment to turn the occupant's head in a first direction when the front surface of the occupant's head receives the normal force and the dynamic friction force from the surface of the front section under the pushing state. Meanwhile, a second directional moment acts to turn the occupant's head in a second direction opposite to the first direction, the second directional moment being caused by a normal force and a dynamic friction force which the side surface of the occupant's head receives from the surface of the left or right section. Since the first directional moment and the second directional moment cancel each other out the occupant's head may be less likely to roll on a surface of the bag body (airbag) when an obstacle diagonally collides with the vehicle from the front.

With regard to the aforementioned airbag apparatus, it is preferable that the bag body includes a contact range to be in contact with the occupant's head when the bag body is expanded and deployed, the contact range being set so that an integral value of a sum of the first directional moment and the second directional moment in the contact range approaches zero.

According to this configuration, an integral value of a sum of the first directional moment and the second directional moment in the contact range approaches zero. This means that the first directional moment and the second directional moment are substantially balanced over the entire contact range. Therefore, the occupant's head may be less likely to roll on the surface of the bag body.

With regard to the aforementioned airbag apparatus, it is preferable that the bag body is configured so that introduction pressure of the expansion gas into the front, left and right sections are equivalent.

According to this configuration, the airbag apparatus does not have to have a component configured to cause different introduction pressure of the expansion gas for each of the front, left and right sections. Therefore, the airbag apparatus may have a simplified structure.

With regard to the aforementioned airbag apparatus, it is preferable that the left and right sections form arc shapes protruding leftward and rightward in a front view, respectively. The left section may include one end, which is connected to one end of the right section, and another end, which is connected to another end of the right section, so that the left and right sections are continuous to form a ring as a whole.

According to this configuration, the left and right sections are continuous to form a ring as a whole when the bag body is expanded and deployed. Therefore, when an external force is applied to the left or right section when the left and right sections are expanded and deployed, stress is distributed over the entire left and right sections. Accordingly, when the occupant's head collides with the left or right section which is expanded and deployed, excessive deformation may be less likely to happen to one of the left and right sections which is hit by the occupant's head. Consequently, the second directional moment may become large enough to surely prevent the occupant's head from rolling on the surface of the bag body.

In the aforementioned airbag apparatus, it is preferable that the left section includes outer fabric, which forms an outer circumferential arc of the left section, and inner fabric, which forms an inner circumferential arc of the left section, the outer fabric being partially coupled to the inner fabric on a side of the front section. The right section may include outer fabric, which forms an outer circumferential arc of the right section, and inner fabric, which forms an inner circumferential arc of the right section, the outer fabric of the right section being partially coupled to the inner fabric of the right section on a side of the front section.

According to this configuration, an expanded and deployed shape may be retained without a shape retaining tether.

With regard to the aforementioned airbag apparatus, it is preferable that the left and right sections linearly extend vertically when the left and right sections are expanded and deployed.

A side surface of the occupant's head is often planar in a vertical direction. Therefore, the left or right section is likely to be in contact with a large area of the side surface of the head. Consequently, the second directional moment may become large enough to surely prevent the head from rolling on the surface of the bag body.

With regard to the aforementioned airbag apparatus, it is preferable that each of the left and right sections includes a shape retaining tether provided inside each of the left and right sections, the shape retaining tether being configured to keep an expanded and deployed shape of each of the left and right sections.

According to this configuration, expanded and deployed shapes may be readily and reliably retained by the shape retaining tether.

With regard to the aforementioned airbag apparatus, it is preferable that the left and right sections have higher internal pressure than the front section when the bag body is expanded and deployed.

According to this configuration, since there may be an increase in contact pressure between the left or right section and the occupant's head, there is also an increase in a normal force and a dynamic friction force received by the occupant's head from the left or right section. Consequently, the second directional moment may become large enough to surely prevent the head from rolling on the surface of the bag body even when the left and right sections have short lengths.

With regard to the aforementioned airbag apparatus, it is preferable that the airbag apparatus further includes a coupling ether situated at a rear side of the bag body when the bag body is expanded and deployed. The coupling tether may couple the left section to the right section.

According to this configuration, the coupling ether may surely keep expanded and deployed shapes of the left and right sections. When the occupant's head enters between the left and right sections, the occupant's head pushes the coupling tether inward. Consequently, since the left and right sections are pulled by the coupling tether and deform toward the occupant's head, the left and right sections may enclose the occupant's head leftward and rightward to protect the occupant's head.

With regard to the aforementioned airbag apparatus, it is preferable that the bag body is configured so as to be expanded and deployed on a steering wheel.

According to this configuration, a driver's head may be protected. If the left and right sections form a ring as a whole when the left and right sections are expanded and deployed, the head may be protected regardless of a rotation angle of the steering wheel.

With regard to the aforementioned airbag apparatus, it is preferable that the bag body is configured so as to be expanded and deployed on an instrument panel.

According to this configuration, the head of a person occupying a passenger seat may be protected.

With regard to the aforementioned airbag apparatus, it is preferable that the bag body is configured so as to be expanded and deployed on a rear surface side of a seat back.

According to this configuration, the head of a person occupying a rear seat may be protected.

The airbag apparatus disclosed in the aforementioned embodiments is used for a vehicle. The airbag apparatus includes a bag body which is expanded and deployed by expansion gas supplied when the vehicle receives an external impact. The bag body includes a base provided in a range from diagonally forward left to diagonally forward right of an occupant's head; a left section which is expanded and deployed so as to project rearward from a left edge of the base; a right section which is expanded and deployed so as to project rearward from a right edge of the base; and a coupling tether which is situated at a rear side of the base when the hag body is expanded and deployed, the coupling tether being configured to couple the left section to the right section. The bag body is expanded and deployed to make the occupant's head in a pushing state when the vehicle diagonally receives an impact from front so that the occupant's head is displaced diagonally forward. Meanwhile a front surface of the occupant's head pushes a surface of the coupling tether whereas a side surface of the occupant's head pushes a surface of the left or right section. A normal force and a dynamic friction force cause a first directional moment to turn the occupant's head in a first direction when the front surface of the occupant's head receives the normal force and the dynamic friction force from the surface of the coupling tether under the pushing state. A second directional moment acts to turn the occupant's head in a second direction opposite to the first direction, the second directional moment being caused by a normal force and a dynamic friction force which the side surface of the occupant's head receives from the surface of the left or right section.

According to this configuration, the bag body is expanded and deployed to make the occupant's head in a pushing state when a vehicle diagonally receives an impact from front. The front surface of the occupant's head pushes a surface of the coupling tether whereas the side surface of the occupant's head pushes a surface of the left or right section under the pushing state. A normal force and a dynamic friction force cause a first directional moment to turn the occupant's head in a first direction when the front surface of the occupant's head receives the normal force and the dynamic friction force from the surface of the coupling tether under the pushing state. Meanwhile, a second directional moment acts to turn the occupant's head in a second direction opposite to the first direction, the second directional moment being caused by a normal force and a dynamic friction force which the side surface of the occupant's head receives from the surface of the left or right section. Since the first directional moment and the second directional moment cancel each other out, the occupant's head may be less likely to roll on surfaces of the bag body (airbag) and the coupling tether when an obstacle diagonally collides with the vehicle from the front.

With regard to the aforementioned airbag apparatus, it is preferable that the bag body and the coupling tether include a contact range to be in contact with the occupant's head when the bag body is expanded and deployed, the contact range being set so that an integral value of a sum of the first directional moment and the second directional moment in the contact range approaches zero.

According to this configuration, an integral value of a sum of the first directional moment and the second directional moment in the contact range approaches zero. This means that the first directional moment and the second directional moment are substantially balanced over the entire contact range. Therefore, the occupant's head may be less likely to roll on the surfaces of the bag body and the coupling tether.

The invention claimed is:

1. An airbag apparatus for a vehicle, comprising
a bag body which is expanded and deployed by expansion gas supplied when the vehicle receives an external impact,
wherein the bag body includes:
a front section configured to be expanded and deployed rearward in a range from diagonally forward left to diagonally forward right of an occupant's head;
a left section which is expanded and deployed so as to project rearward from a left edge of the front section; and
a right section which is expanded and deployed so as to project rearward from a right edge of the front section,
wherein the bag body is configured to be expanded and deployed to make the occupant's head in a pushing state when the vehicle diagonally receives an impact from front so that the occupant's head is displaced diagonally forward, a front surface of the occupant's head pushing a surface of the front section and a side surface of the occupant's head pushing a surface of the left or right section,
wherein a normal force and a dynamic friction force cause a first directional moment to turn the occupant's head in a first direction when the front surface of the occupant's head receives the normal force and the dynamic friction force from the surface of the front section under the pushing state, and
wherein a second directional moment acts to turn the occupant's head in a second direction opposite to the first direction, the second directional moment being caused by a normal force and a dynamic friction force which the side surface of the occupant's head receives from the surface of the left or right section,
wherein each of the left and right sections includes a shape retaining tether provided inside each of the left and right sections, the shape retaining tether being configured to keep an expanded and deployed shape of each of the left and right sections.

2. The airbag apparatus according to claim 1,
wherein the bag body includes a contact range configured to be in contact with the occupant's head when the bag body is expanded and deployed, the contact range being set so that an integral value of a sum of the first directional moment and the second directional moment in the contact range approaches zero.

3. The airbag apparatus according to claim 1,
wherein the bag body is configured so that introduction pressure of the expansion gas into the front, left and right sections are equivalent.

4. The airbag apparatus according to claim 1,
wherein the left and right sections form arc shapes protruding leftward and rightward in a front view, respectively, and
wherein the left section includes one end, which is connected to one end of the right section, and another end, which is connected to another end of the right section, so that the left and right sections are continuous to form a ring as a whole.

5. The airbag apparatus according to claim 4,
wherein the bag body is configured so as to be expanded and deployed on a steering wheel.

6. The airbag apparatus according to claim 1,
wherein the left and right sections linearly extend vertically when the left and right sections are expanded and deployed.

7. The airbag apparatus according to claim 1,
wherein the left and right sections have higher internal pressure than the front section when the bag body is expanded and deployed.

8. The airbag apparatus according to claim 1, further comprising a coupling tether situated at a rear side of the bag body when the bag body is expanded and deployed,
wherein the coupling tether couples the left section to the right section.

9. The airbag apparatus according to claim 1,
wherein the bag body is configured so as to be expanded and deployed on an instrument panel.

10. The airbag apparatus according to claim 1,
wherein the bag body is configured so as to be expanded and deployed on a rear surface side of a seat back.

11. The airbag apparatus according to claim 1,
wherein the front section include a shape retaining tether provided inside the front section to keep an expanded and deployed shape of the front section,
wherein the shape retaining tether in the front section extends forward and rearward to connect inner surfaces of the air bag apparatus,
wherein the shape retaining tether in the left section extends laterally to connect inner surfaces of the left section,
wherein the shape retaining tether in the right section extends laterally to connect inner surfaces of the right section.

12. An airbag apparatus for a vehicle, comprising
a bag body which is expanded and deployed by expansion gas supplied when the vehicle receives an external impact,
wherein the bag body includes:
    a front section which is configured to be expanded and deployed rearward in a range from diagonally forward left to diagonally forward right of an occupant's head;
    a left section which is expanded and deployed so as to project rearward from a left edge of the front section; and
    a right section which is expanded and deployed so as to project rearward from a right edge of the front section,
wherein the bag body is configured to be expanded and deployed to make the occupant's head in a pushing state when the vehicle diagonally receives an impact from front so that the occupant's head is displaced diagonally forward, a front surface of the occupant's head pushing a surface of the front section and a side surface of the occupant's head pushing a surface of the left or right section,
wherein a normal force and a dynamic friction force cause a first directional moment to turn the occupant's head in a first direction when the front surface of the occupant's head receives the normal force and the dynamic friction force from the surface of the front section under the pushing state,
wherein a second directional moment acts to turn the occupant's head in a second direction opposite to the first direction, the second directional moment being caused by a normal force and a dynamic friction force which the side surface of the occupant's head receives from the surface of the left or right section,
wherein the left and right sections form arc shapes protruding leftward and rightward in a front view, respectively,
wherein the left section includes one end, which is connected to one end of the right section, and another end, which is connected to another end of the right section, so that the left and right sections are continuous to form a ring as a whole,
wherein the left section includes outer fabric, which forms an outer circumferential arc of the left section, and inner fabric, which forms an inner circumferential arc of the left section, the outer fabric being partially coupled to the inner fabric on a side of the front section, and
wherein the right section includes outer fabric, which forms an outer circumferential arc of the right section, and inner fabric, which forms an inner circumferential arc of the right section, the outer fabric of the right section being partially coupled to the inner fabric of the right section on a side of the front section.

13. An airbag apparatus for a vehicle, comprising
a bag body which is expanded and deployed by expansion gas supplied when the vehicle receives an external impact,
wherein the bag body includes:
    a base provided and configured to be in a range from diagonally forward left to diagonally forward right of an occupant's head;
    a first section which is expanded and deployed so as to project rearward from the base;
    a second section which is expanded and deployed so as to project rearward from of the base at a laterally distant position from the first section; and
    a coupling tether which is situated at a rear side of the base when the bag body is expanded and deployed, the coupling tether being configured to couple the first section to the second section,
wherein the bag body is configured to be expanded and deployed to make the occupant's head in a pushing state when the vehicle diagonally receives an impact from front so that the occupant's head is displaced diagonally forward, a front surface of the occupant's head pushing a surface of the coupling tether and a side surface of the occupant's head pushing a surface of the first or second section,
wherein a normal force and a dynamic friction force cause a first directional moment to turn the occupant's head in a first direction when the front surface of the occupant's head receives the normal force and the dynamic friction force from the surface of the coupling tether under the pushing state, and wherein a second directional moment acts to turn the occupant's head in a second direction opposite to the first direction, the second directional moment being caused by a normal force and a dynamic friction force which the side surface of the occupant's head receives from the surface of the first or second section.

14. The airbag apparatus according to claim 13, wherein the bag body and the coupling tether include a contact range configured to be in contact with the occupant's head when the bag body is expanded and deployed, the contact range being set so that an integral value of a sum of the first directional moment and the second directional moment in the contact range approaches zero.

15. The airbag apparatus according to claim 13, wherein the first section is a left section which is expanded and deployed so as to project rearward from a left edge of the base; and wherein the second section is a right section which is expanded and deployed so as to project rearward from a right edge of the base.

* * * * *